United States Patent
Scherer et al.

(10) Patent No.: US 11,735,871 B2
(45) Date of Patent: Aug. 22, 2023

(54) NETWORK CABLE CONNECTOR WITH SWITCH CONTROL

(71) Applicant: MERTEK INDUSTRIES, LLC, Austin, TX (US)

(72) Inventors: Christopher B. Scherer, Austin, TX (US); Jon Sholtis, Austin, TX (US)

(73) Assignee: MERTEK INDUSTRIES, LLC, Austin, TX (US)

( * ) Notice: Subject to any disclaimer, the term of this patent is extended or adjusted under 35 U.S.C. 154(b) by 0 days.

(21) Appl. No.: 17/271,931

(22) PCT Filed: Aug. 29, 2019

(86) PCT No.: PCT/US2019/048719
§ 371 (c)(1),
(2) Date: Feb. 26, 2021

(87) PCT Pub. No.: WO2020/047195
PCT Pub. Date: Mar. 5, 2020

(65) Prior Publication Data
US 2021/0320462 A1 Oct. 14, 2021

Related U.S. Application Data

(60) Provisional application No. 62/724,899, filed on Aug. 30, 2018.

(51) Int. Cl.
*H01R 13/70* (2006.01)
*G08B 5/22* (2006.01)
(Continued)

(52) U.S. Cl.
CPC ............... *H01R 13/70* (2013.01); *G08B 5/22* (2013.01); *H01R 13/703* (2013.01); *H04L 12/10* (2013.01);
(Continued)

(58) Field of Classification Search
CPC .. H01R 13/6658; H01R 13/70; H01R 13/703; H01R 13/7175; H01R 24/64;
(Continued)

(56) References Cited

U.S. PATENT DOCUMENTS 5,885,111 A 3/1999 Yu
6,042,419 A 3/2000 Liu
(Continued)

FOREIGN PATENT DOCUMENTS

| CN | 2445472 | 8/2001 |
|---|---|---|
| CN | 101512964 | 8/2009 |
| CN | 101728735 | 6/2010 |

OTHER PUBLICATIONS

International Search Report and Written Opinion issued in corresponding International application PCT/US19/48719 dated Nov. 20, 2019.
(Continued)

*Primary Examiner* — Gary F Paumen
(74) *Attorney, Agent, or Firm* — Norton Rose Fulbright US LLP

(57) ABSTRACT

Disclosed are network cable connectors with components such as switches, displays, and printed circuit with controllers. The disclosed network cable connector may be connected to a power over Ethernet (POE) power sourcing equipment (PSE). The printed circuit of the cable connector may request power for the display from the PSE. The switch of the cable connector may be operated such that at least one component of the printed circuit is disconnected from the PSE when an external powered device (PD) is connected to the cable connector. Disconnecting components of the printed circuit from the PSE may reduce the interference to the power negotiation between the PSE and external PD.

20 Claims, 21 Drawing Sheets

(51) Int. Cl.
*H01R 13/703* (2006.01)
*H04L 12/10* (2006.01)
*H01R 13/717* (2006.01)
*H01R 24/62* (2011.01)

(52) U.S. Cl.
CPC .......... *H01R 13/7175* (2013.01); *H01R 24/62* (2013.01); *H01R 2201/04* (2013.01)

(58) Field of Classification Search
CPC .... H01R 24/62; H01R 2201/04; H04Q 1/136; H04Q 1/03; H04L 12/10; G08B 5/22
USPC ...... 439/620.23, 676, 557, 540.1; 379/27.01, 379/156, 25, 327; 340/8.1; 348/552
See application file for complete search history.

(56) References Cited

U.S. PATENT DOCUMENTS

| | | |
|---|---|---|
| 6,222,908 B1 | 4/2001 | Bartolutti |
| 6,454,611 B1 | 9/2002 | Francis |
| 6,900,629 B2 * | 5/2005 | Hwang ................. G01R 31/67 |
| | | 324/66 |
| 8,070,531 B1 | 12/2011 | Ku et al. |
| 8,827,748 B2 * | 9/2014 | Scherer .................... H04Q 1/03 |
| | | 439/620.23 |
| 2003/0199200 A1 * | 10/2003 | Chan ...................... H01R 31/06 |
| | | 439/638 |
| 2004/0229501 A1 | 11/2004 | Caveney et al. |
| 2010/0048064 A1 | 2/2010 | Peng |
| 2012/0187961 A1 | 7/2012 | Hashim et al. |
| 2013/0316583 A1 | 11/2013 | Scherer et al. |
| 2015/0132975 A1 | 5/2015 | Yossef |

OTHER PUBLICATIONS

International Search Report and Written Opinion issued in corresponding International application PCT/US2011/001347 dated Mar. 23, 2012.
Office Action issued in corresponding Chinese Application No. 201180044756.0, dated Nov. 6, 2015.
Chinese Search Report issued in corresponding Chinese Application No. 2011800447560, dated Dec. 25, 2014.
Australian Examination Report issued in corresponding Australian Application No. 2011286457, dated Apr. 3, 2013.

* cited by examiner

NETWORK CABLE CONNECTOR WITH SWITCH CONTROL

CROSS-REFERENCE TO RELATED APPLICATIONS

This application is a national phase under 35 U.S.C. § 371 of International Application No. PCT/US2019/048719, filed Aug. 29, 2019, which claims the benefit of priority to U.S. Provisional Patent Application Ser. No. 62/724,899, filed Aug. 30, 2018, the entire contents of each of which of the foregoing applications are hereby incorporated by reference in their entirety.

TECHNICAL FIELD

The present disclosure relates generally to network cable connectors, and more particularly, but not by way of limitation, to network cable connectors with switch control.

BACKGROUND

A networking cable is configured to carry signals from one electronic device to another. The term signals can mean data signals, power, or telephone communications. Electronic devices include but are not limited to terminals, personal computers, printers, workstations, hubs, switches, storage devices, tape drives, routers, telephone switches, and servers. Networking cables, frequently referred to, as "jumper cables", "patch cables", or simply "cables", typically are multiple pair copper wires packaged in an outer flexible sheath. Networking cables are designed to interconnect an electronic device with another electronic device. Such networking cables often are used in systems where there are many networking cables connected to frames, panels, or electronic devices, each of which may have many connecting cables and which may be located closely adjacent other similar frames, panels, or electronic devices, sometimes without carefully regimented management of the cables. The connections of each cable may be remote from one another, even being in separate rooms or spaces, and the networking cables may be of substantial length.

A network cable connector, such as jack connector (e.g., a receptacle) or a plug connector, associated with a network cable may be coupled to power sourcing equipment (PSE), such as power over Ethernet (POE) PSE. Some network cable connectors include circuitry that may be powered by the PSE, such that the network cable connector is viewed as a powered device (PD) from the perspective of the PSE. For example, a network cable connector may include circuitry that is configured to provide an indication that the network cable connector is coupled to PSE. An example of such a network cable connector is described in U.S. Pat. No. 8,827,748.

In systems where a network cable connector is coupled to a PSE and is receiving power from the PSE (i.e., the network cable connector is viewed as a PD), connecting an external PD to the PSE via the network cable connector can be problematic. For example, network cable connector (e.g., a load of the network cable connector, such as a resistor) can interfere with power negotiation between the external PD and PSE. This interference and/or additional load of the network cable connector may cause the PSE to improperly and/or inaccurately categorize or otherwise determine a power need of the external PD. Improper and/or inaccurate categorization of the power need of the external PD causes the PSE to provide more power than is needed to the external PD, which results in a waste of power and inefficient operation of the PSE and PD. Additionally, when the external PD is coupled to the PSE via the network cable connector, the PSE is unable to detect when an external PD has been disconnected from network cable connector because of the load of the network cable connector. In such situations, the PSE continues to provide power as though the external PD were still connected, which results in further waste of power and system inefficiency.

SUMMARY

The present disclosure describes a network cable connector and systems and methods for using and producing the network cable connector. The network cable connector includes one or more components, such as a switch, a display, a circuit (e.g., a printed circuit of a printed circuit board or a flex circuit), a connection hood (e.g., a hood), or a combination thereof. The disclosed network cable connector may be connected to power sourcing equipment (PSE), such as power over Ethernet (POE) PSE. The printed circuit of the cable connector may request power for the display from the PSE. The switch of the cable connector may be operated such that at least one component of the printed circuit is disconnected from the PSE when an external powered device (PD) is connected to the cable connector. Disconnecting components of the printed circuit from the PSE may reduce the interference to the power negotiation between the PSE and external PD, reduce power consumption of one or more devices, and enables the PSE to correctly detect that an external PD has been disconnected from network cable connector, as described further herein.

In some implementations, prior to a powered device (PD) being coupled to the network connector, network cable connector is coupled to an external power source, such as power sourcing equipment (PSE) (e.g., power over Ethernet (POE) PSE), to provide power to the circuit (e.g., a printed circuit board or a flex circuit) of network cable connector. For example, circuitry, such as the printed circuit board or the flex circuit, of network cable connector may be configured to perform a power negotiation with the PSE. To illustrate, the circuitry (e.g., the printed circuit board or flex circuit) may be complaint with one or more POE standards or technical specifications, such as IEEE 802.3af, IEEE 802.3.at, Cisco Inline Power, etc. Accordingly, when the network cable connector is coupled to the PSE, the network cable connector operates as a PD with respect to the PSE.

After network cable connector is coupled to PSE and is receiving power from PSE, a PD (e.g., external PD) is coupled to the PSE via the network cable connector. As part of coupling the external PD to the PSE, switch of network cable connector may be operated (e.g., actuated manually, electronically, automatically, etc.) to bypass or disconnect circuitry (e.g., printed circuit or flex circuit) of the network cable connector from being electrically coupled to POE PSE. In this way, the external PD may request power from the POE PSE without the interference from the circuitry, such as a resistor of printed circuit, which may otherwise be used to request power for network cable connector when the external PD is requesting power. The PSE may then adjust the power to be supplied to the external PD according to the classification and power may be saved.

Additionally, the ability of network cable connector to stop the circuitry (e.g., printed circuit or flex circuit) from requesting power from PSE when an external PD is connected not only reduces inference to the external PD but also reduces power consumption. For example, because the circuitry (or a portion thereof) of the network cable connector is disconnected from the PSE during power negotiation(s) between the PD and PSE, the PSE is able to determine/categorize a power need of the PD without the circuitry (or portion thereof) of the network cable connector. Therefore, before or upon an external PD being connected to network cable connector, disconnecting some components of printed circuit (such as a resistor, which is used by printed circuit to request power from the PSE) from the PSE by the switch (of the network cable connector) may allow the PSE to correctly classify the external PD. The PSE may then adjust the power to be supplied to the external PD according to the classification and power may be saved.

Further, disconnecting some components of printed circuit (such as resistor, which is used by printed circuit to request power from the PSE) from the PSE by the switch (of the network cable connector) may allow the PSE to correctly detect that an external PD has been disconnected from network cable connector. To illustrate, the PSE disconnects power to a PD when the PSE stops receiving a power signature from the PD when the circuitry (or portion thereof, such as a resistor) of the network cable connector is disconnected while external PD is coupled to PSE. If the circuitry (or portion thereof, such as a resistor) of the network cable connector were not disconnected (or otherwise bypassed) when the power signature from the PD stops, the PSE would continue to supply power to the network cable connector based on previous power negotiation between the PD and the PSE.

Some embodiments of the present network cable connectors comprise: a hood having an opening configured to receive a plug; a circuit (e.g., a printed circuit) incorporated into the hood and configured to couple to an external power source via one or more conductor wires; and a switch coupled to the printed circuit and incorporated into the hood; where the switch is configured to connect or disconnect the printed circuit to or from the external power source. The circuit (e.g., a printed circuit) may include a flex circuit and/or a circuit included in a printed circuit board. The network cable connector may also comprise a display incorporated into the hood, wherein the display is coupled to the printed circuit and configured to display information relevant to the connector. In some implementations, the network cable connector includes a keystone jack or a keystone coupler (e.g., an inline keystone coupler).

The external electric power source of the network cable connector may be a battery, or direct current (DC) power source, or a power-over-Ethernet (POE) power sourcing equipment (PSE). The printed circuit of the network cable connector may be configured to request power for the display from the PSE.

The switch may be manually operated to disconnect at least one component of the printed circuit from the external power source. Alternatively, the switch may also be configured to automatically disconnect at least one component of the printed circuit from the PSE when a POE powered device (PD) is plugged into the connector.

The displayed information relevant to the connector may comprise at least one of: an operating status of the connector, a power connection status of the connector, a security setting of the connector, an Internet protocol (IP) address of a device coupled to the connector, and a media access control (MAC) address of a device coupled to the connector.

In some implementations, the network cable connector may be coupled to a plate (e.g., a face plate), such as a wall plate. For example, one or more network cable connectors may be coupled to the plate. In a particular implementation, the network cable connecter is integrated in (e.g., incorporated in) the plate such that one or more components to the network cable connector are coupled to the plate. In such implementations, a network cable may be coupled to wire connectors of the plate/network cable connector after which the plate may be mounted to a wall.

Some embodiments of a method to make a network cable connector comprises: providing a hood with an opening configured to receive a plug; incorporating a printed circuit into the hood, the printed circuit configured to couple to an external power source via one or more conductor wires; and coupling a switch to the printed circuit, the switch incorporated into the hood; where the switch is configured to connect or disconnect at least one component of the printed circuit to or from the external power source. The circuit (e.g., a printed circuit) may include a flex circuit and/or a circuit included in a printed circuit board. In some implementations, the network cable connector includes a keystone jack or a keystone coupler (e.g., an inline keystone coupler).

The method may further comprise incorporating a display into the hood and coupling the display to the printed circuit, where the display is configured to display information relevant to the connector. In some implementations, the network cable connector may be coupled to or included in a plate, such as a wall plate.

Some embodiments of a method to operate a network cable connector comprises: connecting a circuit (e.g., a printed circuit of a flex circuit or a printed circuit board) of a network cable connector to an external power source via one or more conductor wires, wherein the printed circuit is configured to request power from the external power source for a display incorporated into network cable connector; operating a switch incorporated into the network cable connector to connect or disconnect at least one component of the printed circuit to or from the external power source. Operating the switch may comprise applying a force to the switch by pressing, or plugging a PD into the connector, which causes the switch to disconnect at least one component of the printed circuit from the PSE.

Any embodiment of any of the present cables, systems, apparatuses, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Some details associated with the embodiments are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DESCRIPTION OF ILLUSTRATIVE EMBODIMENTS

Figure 1:
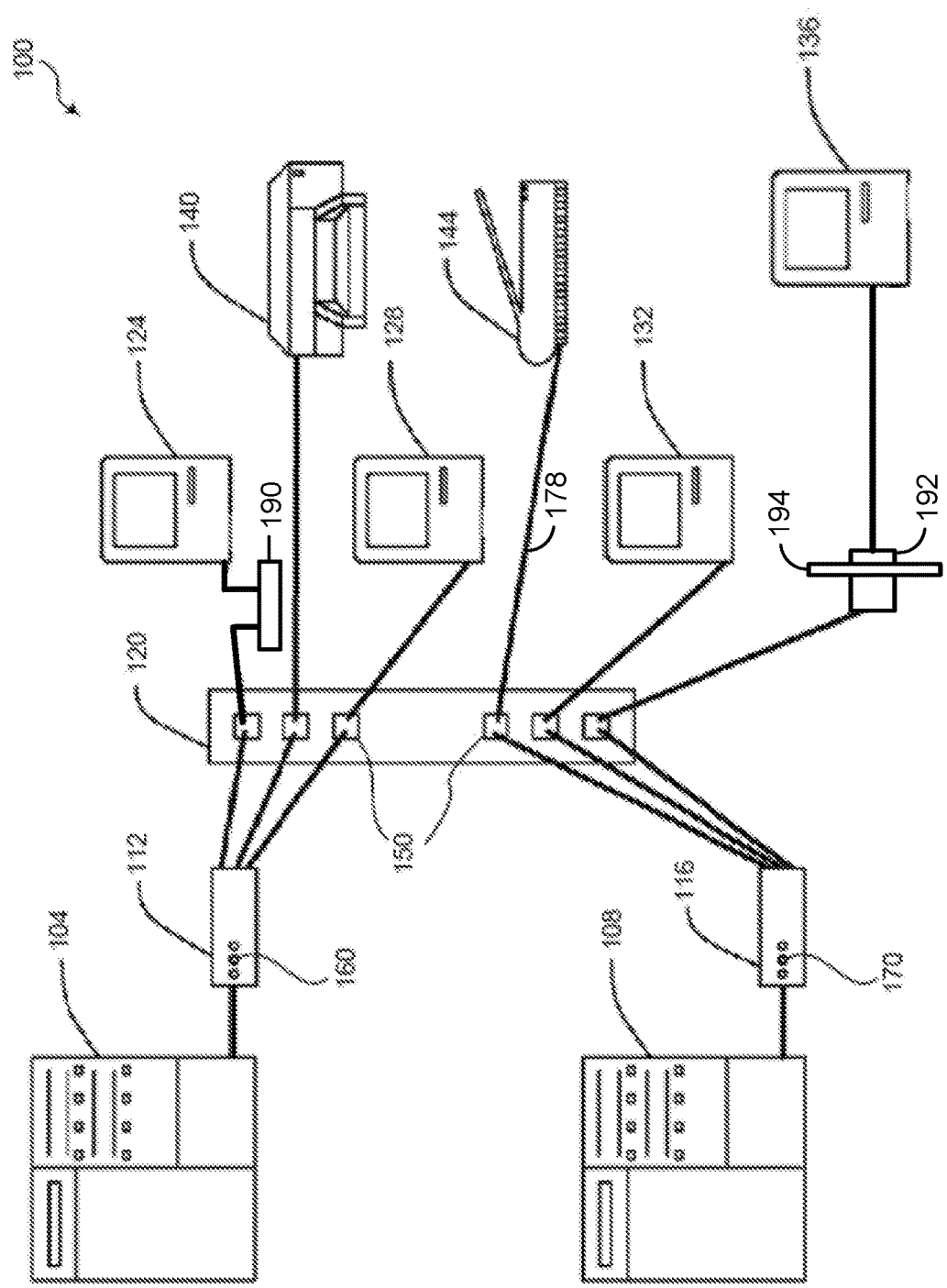
FIG. 1 illustrates a schematic view of a networked computer environment.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes .1, 1, 5, and 10 percent. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system or apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps. Additionally, it will be understood that the term "wherein" may be used interchangeably with "where."

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a structure (e.g., a component of an apparatus, such as a cable) that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

FIG. 1 illustrates an example of a networked environment 100 that includes servers, computers, hubs, peripheral devices, and a cable panel, each of which may include one or more connectors (e.g., a network cable connector). As shown, computers 124, 128, 132, and 136 are each connected by network cables to a cable panel 120 via cable connectors 150. As shown, each cable connector 150 includes one or more cable connectors that are each configured to receive a corresponding jack associated with a network cable, such as a representative network cable 178. Network cable 178 may include one or more wires (e.g. conductors), such as one or more insulated wires. Each wire may be configured to communicate data signals, power signals, or both. The computers can be at multiple locations, such as in different rooms and/or buildings. To illustrate, computer 128 may be located in a first room, on a first floor, of a building and computer 132 may be located in a second room, on a second floor, of the building.

Also attached to panel 120 by network cables via connectors 150 are peripheral devices, such as printer 140 and scanner 144 as illustrative, non-limiting examples. Panel 120 is often located at a central room where service personnel can access panel 120. Often, access to the central room that includes panel 120 is restricted. From panel 120, multiple computers and peripheral devices are often linked by networked cables to hubs such as 112 and 116 via connectors 160, 170. Hubs 112 and 116 may be in turn be connected to servers 104 and 108. Multiple servers and hubs may be housed in a room.

Network environment 100 may also include one or more additional cable network connectors, such as network cable connector 190 and network cable connector 192. Examples of network cable connectors 150, 160, 170, 190, and 192 are described further herein at least with reference to FIGS. 2A-2F, 3A-3G, and 4A-4F. Network cable connector 190, 192 may include a plug (associated with an opening) that is configured to receive a jack associated with a network cable. In some implementations, network cable connector 190, 192 comprises a coupler that is configured to communicatively and/or electrically couple two network cables. In particular implementations, one or more of the network cable connectors 150, 160, 170, 190, and 192 includes a keystone jack or a keystone coupler. In some implementations, a network cable connector 190 and 192 may be configured as a wall jack, e.g., attached to a plate (e.g., a wall plate) or a support structure. For example, as shown, network cable connector is coupled (e.g., mounted) to or incorporated in a plate, such as a wall plate 194. Examples of plates are described further herein at least with reference to FIGS. 10A-10B, 11A-11B, and 12A-12B.

In some implementations, one or more network cable connector 150, 160, 170, 190, and 192 200 may comply with one or more interface standards. For example, a network cable connector may be configured to be compatible with 8P8C connector interfaces, such as RJ-45, RJ-48, or RJ-61 interfaces. As another example, a network cable connector may be configured to be compatible for 10P10C connector interfaces, such as RJ-50 interfaces.

In some implementations, a server (e.g., 104, 108), a hub (e.g., 112, 116), and/or a panel (e.g., 120) also represent an external power source that provides power to another device devices (e.g., 124, 128, 132, 136, 140, 144). In such implementations, at least some of the cables extending between the various devices and panel 120 may include or be configured to operate as power cables. In a particular implementation, a server (e.g., 104, 108), a hub (e.g., 112, 116), and/or a panel (e.g., 120) configured to operate as an external power source may be referred to as power sourcing equipment (PSE). The PSE may be configured to provide power over Ethernet (POE) to one or more devices referred to herein as one or more powered devices (PDs). The external power source (e.g., PSE) may be complaint with POE standards or technical specifications, such as IEEE 802.3af, IEEE 802.3.at, Cisco Inline Power, etc., and configured to draw power from a POE PSE.

Various protocols (e.g., Ethernet) can be used to support data transfer between computers and servers. The example shown in FIG. 1 is relatively a small network, and networks may often be much larger. In addition to the devices shown in FIG. 1, networks can include, for example, other electronic devices such as mobile devices, workstations, switches, tape drives, storage devices, telephone switches, voice over Internet protocol (VOIP) devices, routers, and/or any other device that may be connected to a network (e.g., a camera), as illustrative, non-limiting examples. With large networks, the total number of network cables may be very large, and routine maintenance functions (e.g., the addition or change of computers) can require significant time and manpower to trace connections throughout the network.

Figure 2A:
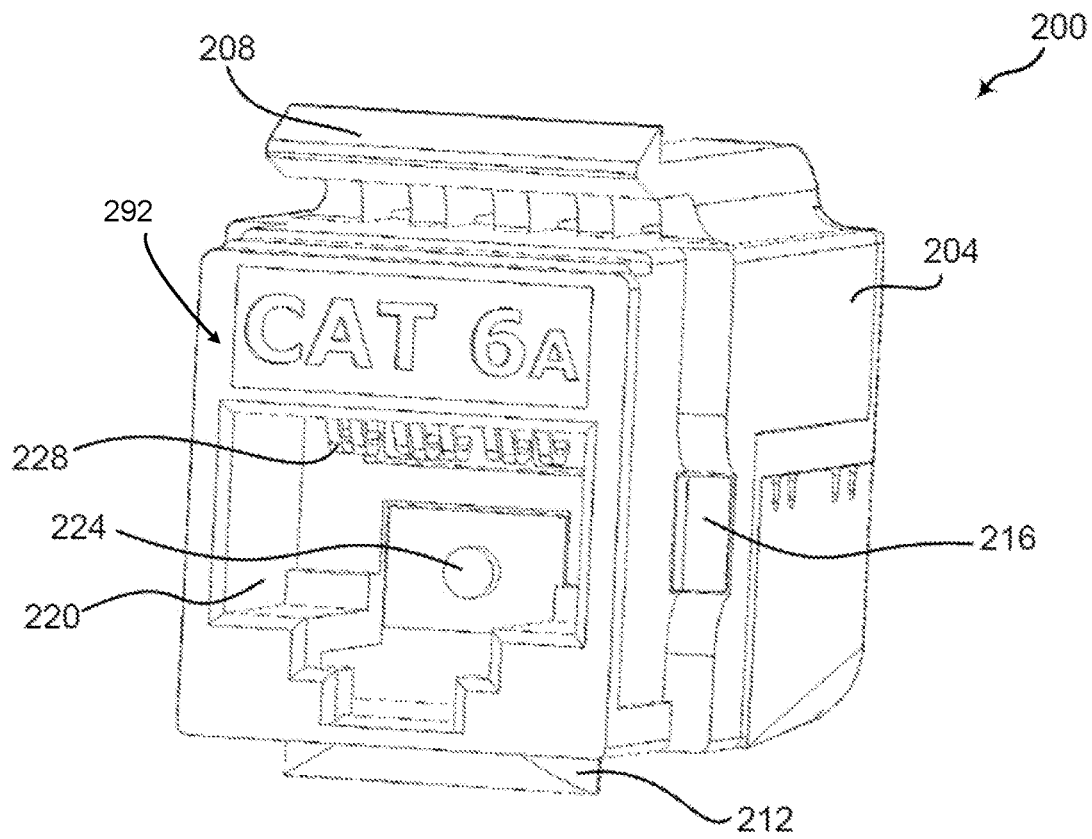
FIG. 2A illustrates a front, upper perspective view of a network cable connector according to one aspect of the present disclosure.
Figure 2B:
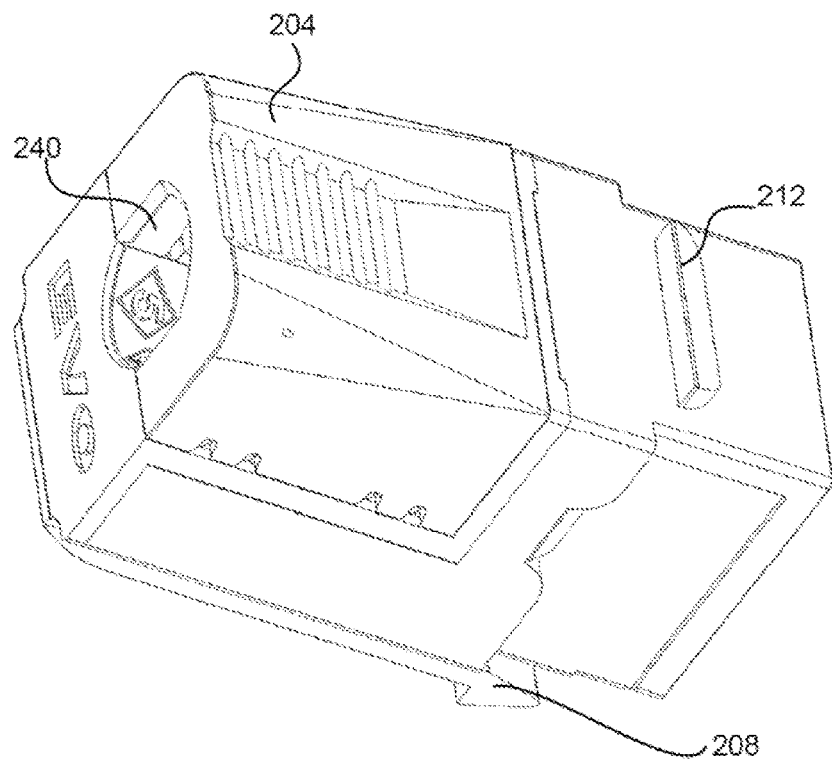
FIG. 2B illustrates a back, lower perspective view of a network cable connector according to one aspect of the present disclosure.
Figure 2C:
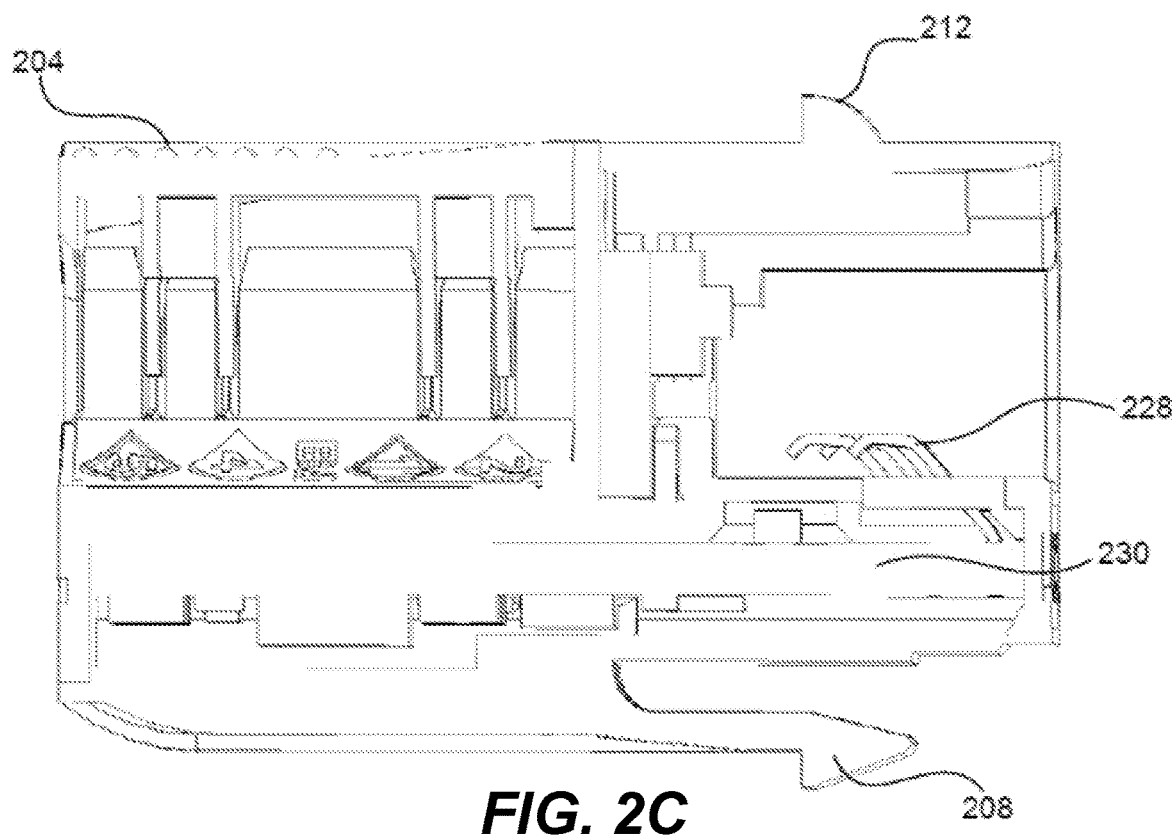
FIG. 2C illustrates a side cross-sectional view of a network cable connector according to one aspect of the present disclosure.
Figure 2D:
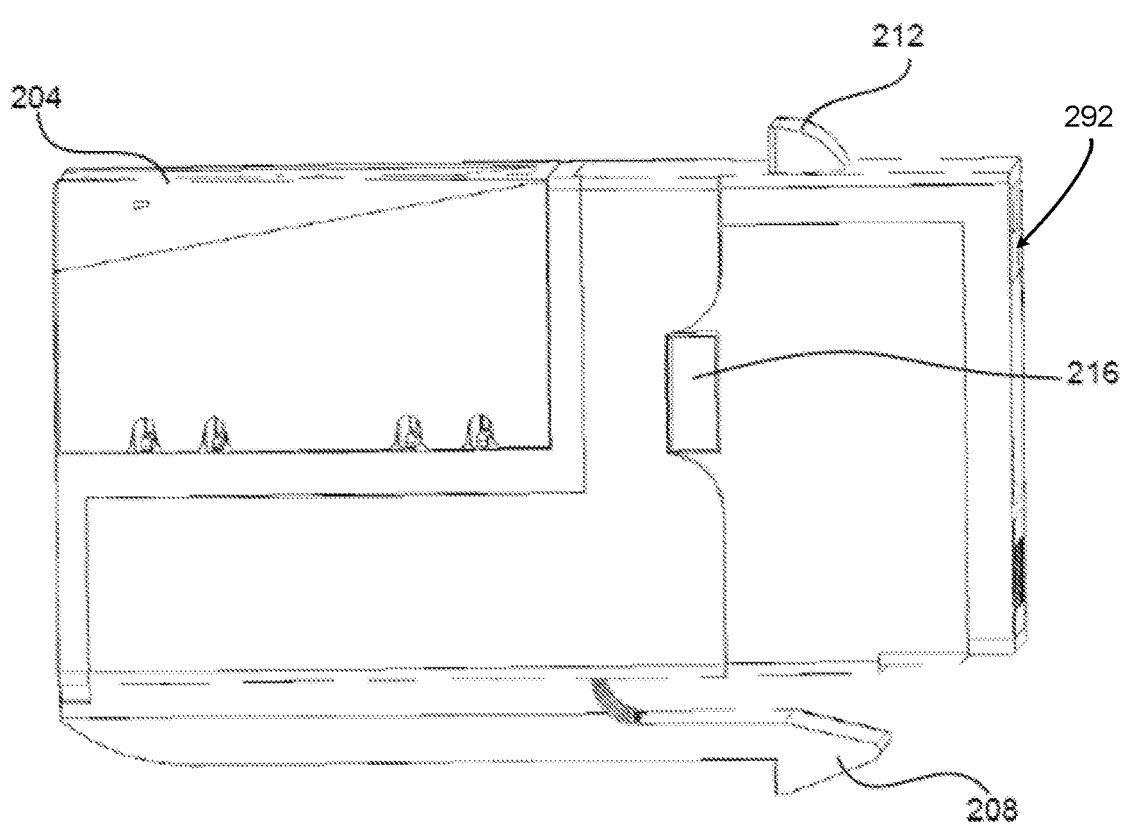
FIG. 2D illustrates a side view of a network cable connector according to one aspect of the present disclosure.
Figure 2E:
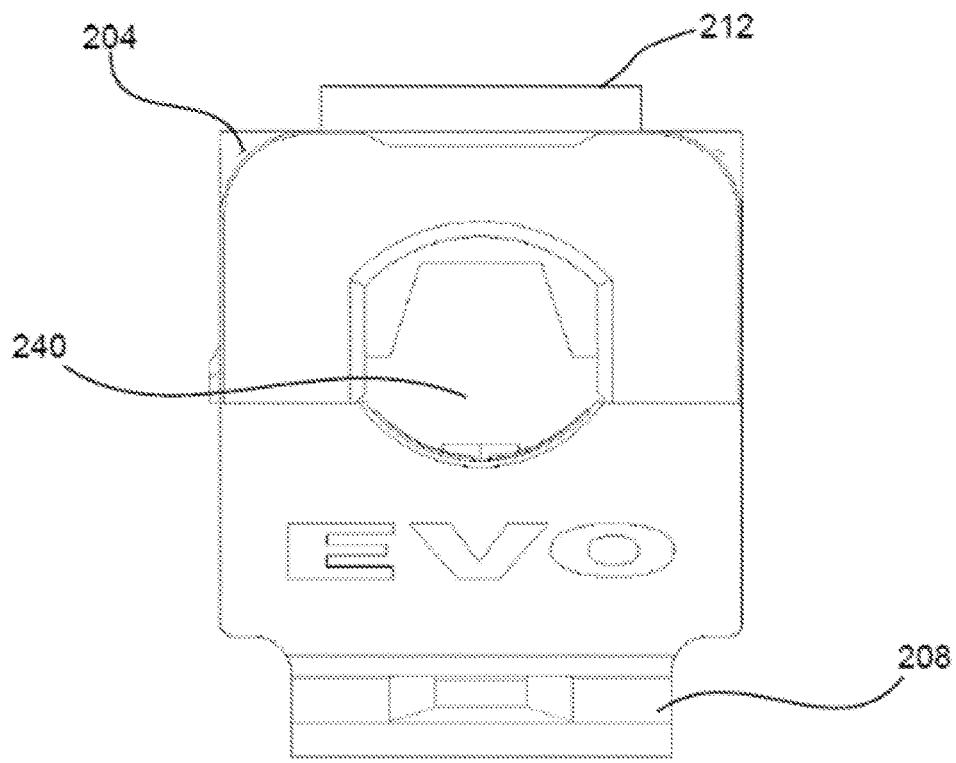
FIG. 2E illustrates a back view of a network cable connector according to one aspect of the present disclosure.
Figure 2F:
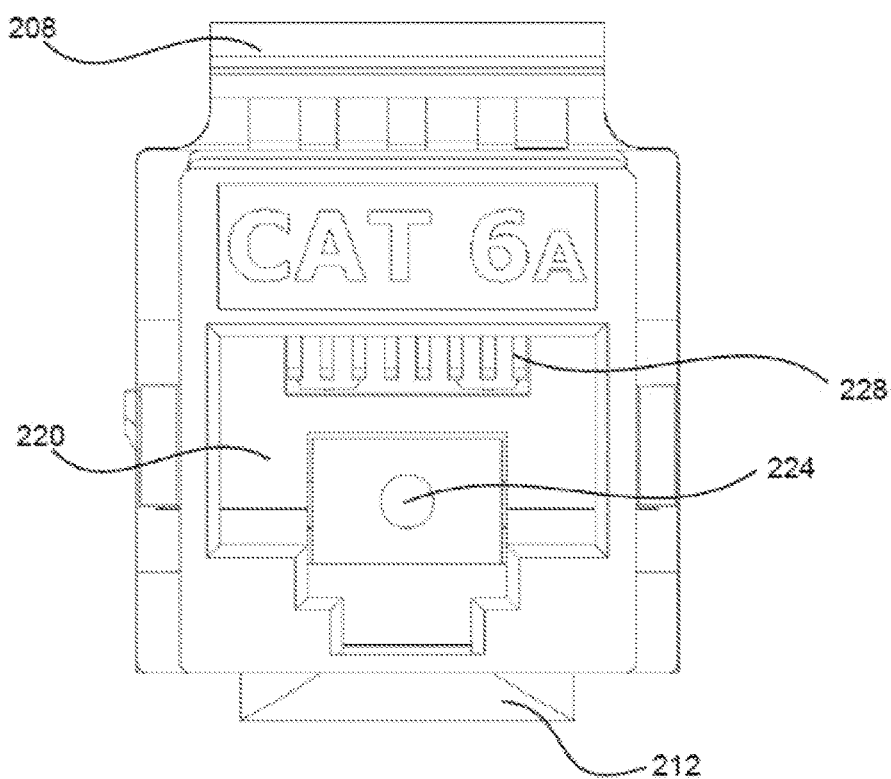
FIG. 2F illustrates a front view of a network cable connector according to one aspect of the present disclosure.
Figure 2G:
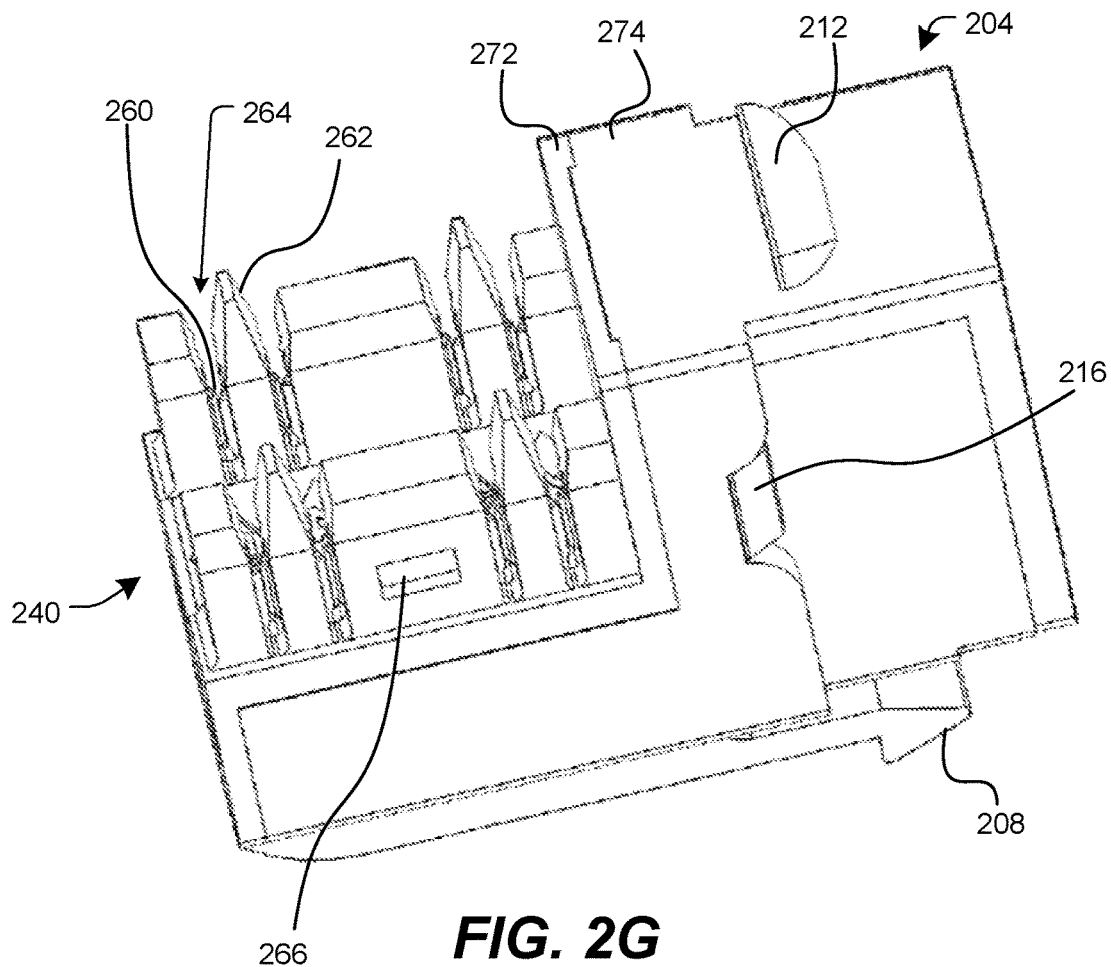
FIG. 2G illustrates a cross-section of a side, upper perspective view of network cable connector without a portion of the hood according to one aspect of the present disclosure.
Figure 2H:
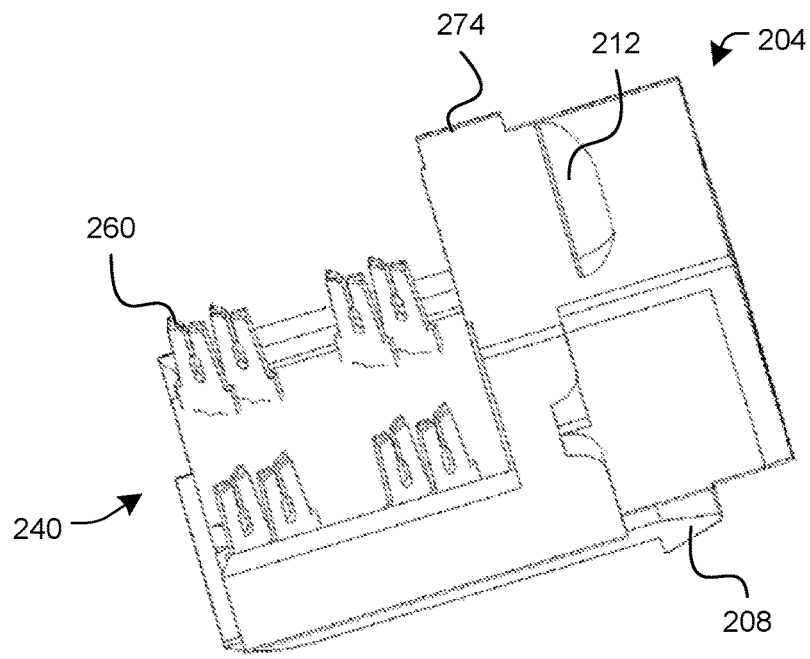
FIG. 2H illustrates a cross-section of a side, upper perspective view of a network cable connector without portions of the hood according to one aspect of the present disclosure.
Figure 2I:
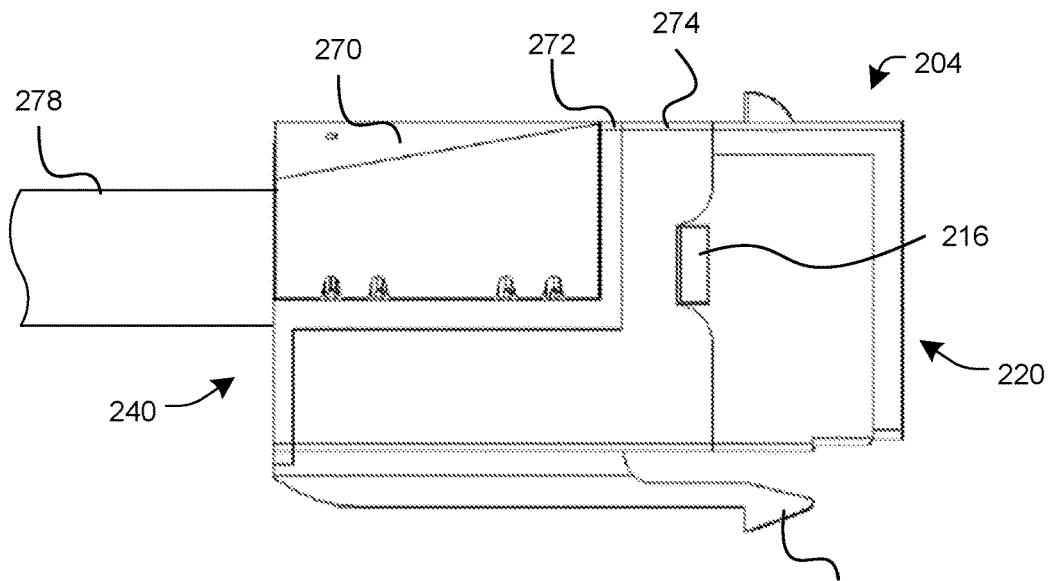
FIG. 2I illustrates a cross-section of a side view of a network cable connector that is coupled to a network cable according to one aspect of the present disclosure.
Figure 2J:
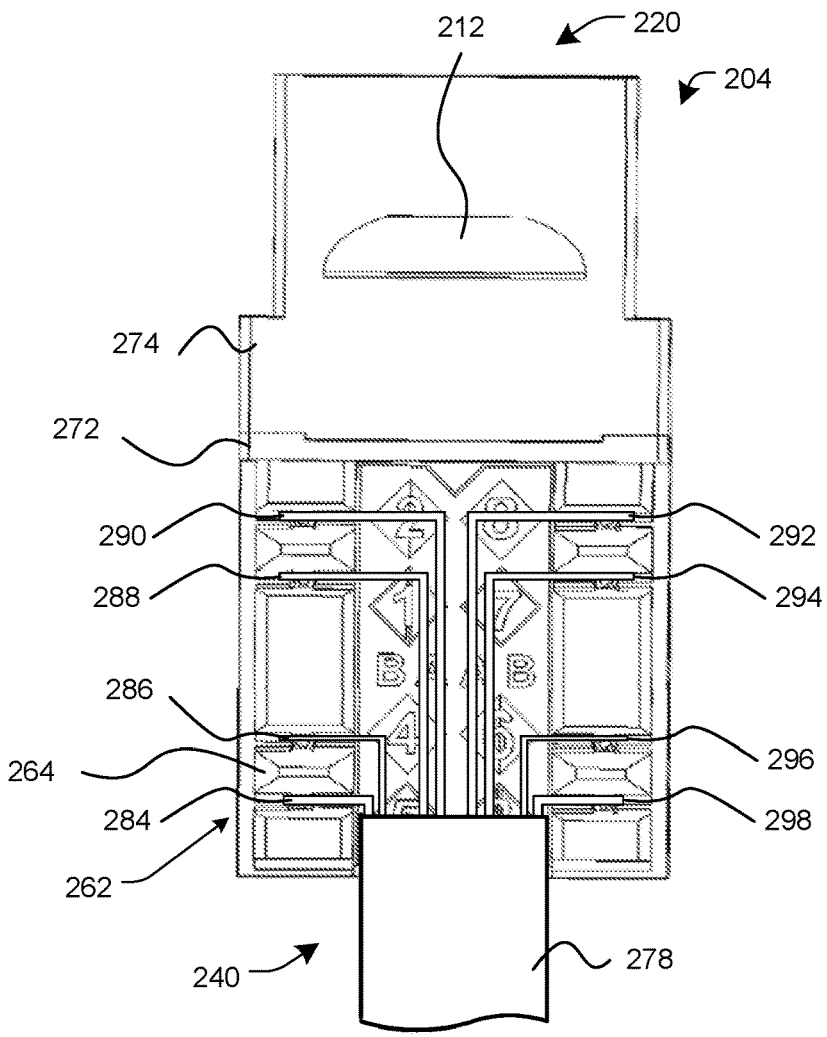
FIG. 2J illustrates a cross-section of a top view of a network cable connector without a portion of the hood and that is coupled to a network cable according to one aspect of the present disclosure.

FIGS. 2A-2F each show a different view of an example of a network cable connector 200. FIG. 2A illustrates a front, upper perspective view, FIG. 2B illustrates a back, lower perspective view, FIG. 2C illustrates a side cross-sectional view, FIG. 2D illustrates a side view, FIG. 2E illustrates a back view, FIG. 2F illustrates a front view, FIG. 2G illustrates side, upper perspective view, FIG. 2H illustrates a side, upper perspective view, FIG. 2I illustrates a side view, and FIG. 2J illustrates a top view. Network cable connector 200 may be used in the networked environment of FIG. 1 or other similar networked environment. For example, network cable connector 200 may include or correspond to 150, 160, 70, 190, 192 of FIG. 1.

As depicted in FIGS. 2A-2J, network cable connector 200 includes a hood 204 (e.g., a housing) with a first opening 220 and a second opening 240 deposed on two sides of network cable connector 200. First opening 220 may be configured to receive a plug, such as a network cable plug. Second opening 240 may be configured to receive a network cable, which may connect network cable connector 200 to another device, such as an external power source, another network device, etc. Thus, network cable connector 200 may be configured to connect one device to another, like cable connectors 150, 160 on panel 120 or hubs 112, 116 described in FIG. 1. In some implementations, network cable connector 200 may include or correspond to a keystone jack.

In some embodiments, network cable connector 200 may also be configured as a wall jack (e.g., receptacle). For example, network cable connector 200 may be attached to a plate, such as a wall plate (e.g., 194). Network cable connector 200 may include a clip 208 configured to lock the connector when inserted into a wall plate or other devices, such as a hub, a router, a panel, etc. Network cable connector 200 may further include one or more side latches 216 to secure the connector to another device, such as a wall plate, a panel, a hub, etc. and/or to couple portions of hood 204. Additionally, or alternatively, network cable connector 200 may be connected to a power over Ethernet (POE) powered device (PD) through first opening 220 and to a power sourcing equipment (PSE) through second opening 240, such that the PD may request power from PSE over Ethernet cables.

A circuit 230 (e.g., a printed circuit), as shown in FIG. 2C, may be housed in hood 204 of network cable connector 200. Printed circuit 230 may have a similar layout, circuitry, and/or functionality as printed circuit 500 shown in and described with reference to FIG. 5. Circuit 230 (e.g., a printed circuit) may include a flex circuit and/or a circuit included in a printed circuit board. In a particular implementation, printed circuit 230 includes a flexible circuit or flex circuit that is affixed to and/or molded into hood 204.

An array of contact pins 228 may be coupled to printed circuit 230 and configured to be connected to a plug received via opening 220. In some embodiments, contact pins 228 may include 8 pins, making network cable connector 200 compatible with 8P8C connector interfaces, such as RJ-45, RJ-48, or RJ-61 interfaces. In some embodiments, contact pins 228 may include 10 pins, making connector 200 compatible for 10P10C connector interfaces, such as RJ-50 interfaces.

Connector 200 may also include a switch 224 incorporated into hood 204. As shown, switch 224 is exposed to first opening 220. In some embodiments, switch 224 may be configured to be easily detached from hood 204 and replaced. For example, switch 224 may be a modular component (having electrical contacts) that can be physically coupled and decoupled to hood 204 (having corresponding electrical contacts). Switch 224 may include any type of switch, such as a wirelessly operated switch, a push button switch, a toggle switch, a manual switch, a magnetic switch, an electromechanical switch, etc., as illustrative non-limiting examples. In implementations in which switch 224 is a wirelessly operated switch, operation of switch 224 may be controlled via an infrared signal, a wireless protocol signal (e.g., infrared, Bluetooth, Zigbee, etc.). Additionally, in implementations in which switch 224 is a wirelessly operated switch, printed circuit 230 may include wireless communication/control circuitry.

Switch 224 may be coupled to printed circuit 230 and configured to connect one or more components of printed circuit 230 to another device, or disconnect such one or more components from the device. Switch 224 may be manually operated by pressing, for example, pressed with a finger or pressed by a plug when the plug is inserted into first opening 220. The connecting and/or disconnecting of one or more components of the printed circuit via the operation of switch 224 is similar to the operation of switch 524 in FIG. 5 described below. In some implementations, switch 224 may be positioned on hood 204 outside of first opening 220. To illustrate, switch 224 may be located on surface 292 of hood 204. In such an implementation, switch 224 may be manually actuated during insertion of a plug, via first opening 220, into network cable connector 200.

Network cable connector 200 may include a display 212 integrated into hood 204 and coupled to printed circuit 230. In some embodiments, display 212 may be configured to be easily detached from hood 204 and replaced. Display 212 may be a light emitting diode (LED) display, an alphanumeric display, or the like. Display 212 may be configured to display information relevant to network cable connector 200, such as connector operating status, IP address, MAC address, power status, type of equipment coupled to connector 200, location of a far end device, connector security settings, security lock-out status, etc. The information may be obtained by printed circuit 230 and then transmitted to display 212. In some implementations, display 212 may be positioned on surface 292 of hood 204. In a particular implementation, both display 212 and switch 224 are positioned on surface 292. In yet another implementation, display 212 and switch 224 may be configured such that switch is actuated by touching or pressing display 212.

Referring at least to FIGS. 2G-2J, hood 204 includes multiple portions, such as a first portion 270, a second portion 272, and a third portion 274. Each of which is coupled together to form hood 204. As shown, second portion 272 includes one or more side latches 216 that are configured to engage third portion 274 to couple second portion 272 and third portion 274. First portion 270 may be coupled to or otherwise engaged with second portion 272, third portion 274, or both. As shown, second portion 727 includes a recess 266 configured to receive and engage a tab (or protrusion) of first portion 270 to couple first portion 270 to second portion 272.

Referring to FIG. 2G in which first portion 270 has been omitted and FIG. 2H in which first and second portions 270, 272 have been omitted, network cable connector 200 includes connectors 260 (e.g., clips) and dividers 262. Dividers 262 separate 260 and define slots 264 configured to receive wires (e.g., conductors) of a network cable coupled to network cable connector 200 via second opening 240, as described at least with reference to FIGS. 2I-2J Each connector 270 may be configured to be electrically coupled to and secure a corresponding wire of a network cable. In some implementations, connectors 270 may be configured such that when an insulated wire is inserted into a connector, the connector cuts/breaks the insulation of the wire and makes physical contact with a conductor of the insulated wire. In such implementations, an end of the insulated wire does not need to be prepared to remove a portion of the insulation to expose the conductor prior to inserting the insulated wire (e.g., the conductor) in slot 264. In some implementations, dividers 262 are included in second portion 272 and are configured to provide a non-conductive barrier between adjacent (e.g., neighboring) connectors 260. As shown, network cable connector 200 includes 8 connectors 260. Alternatively, in other implementations, network cable connector 200 may include more than 8 connectors or fewer than 8 connectors.

Referring to FIGS. 2I and 2J, a network cable 278 is coupled to network cable connector 200 via second opening 240. Network cable 278 may include or correspond to a network cable of FIG. 1, such as network cable 178. As shown in FIG. 2J, network cable 278 includes 8 wires 284-298. Each of the wires 284-298 is coupled to a different connector 260 of network cable 200. In some implementations, at least one of the wires 284-298 is configured to communicate power.

Figure 3A:
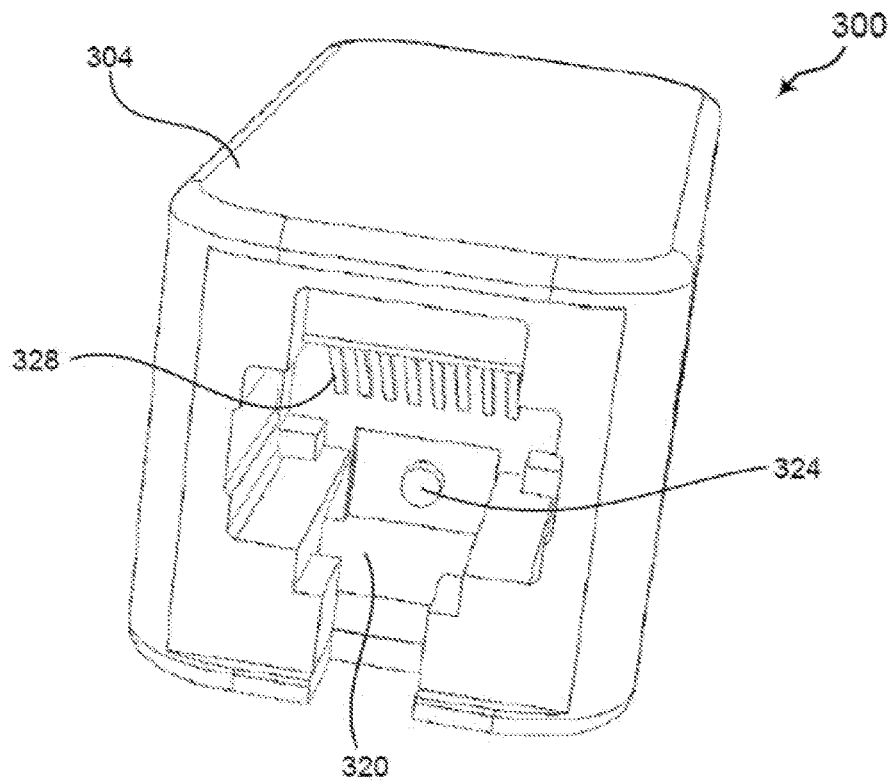
FIG. 3A illustrates a front, upper perspective view of a network cable connector according to one aspect of the present disclosure.
Figure 3B:
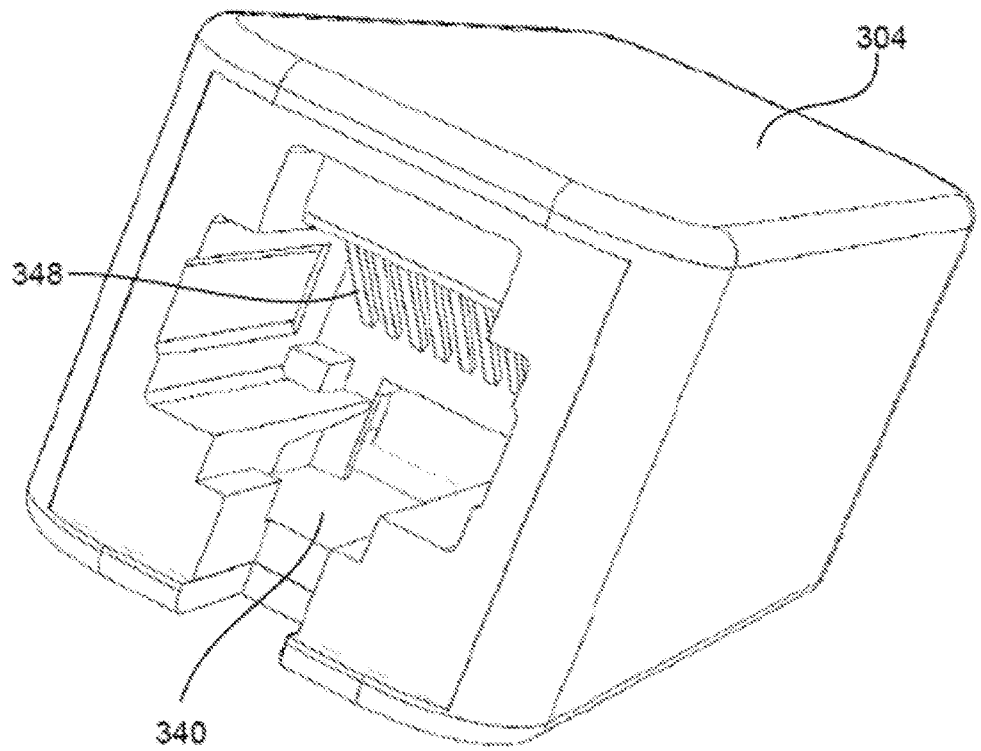
FIG. 3B illustrates a back, lower perspective view of a network cable connector according to one aspect of the present disclosure.
Figure 3C:
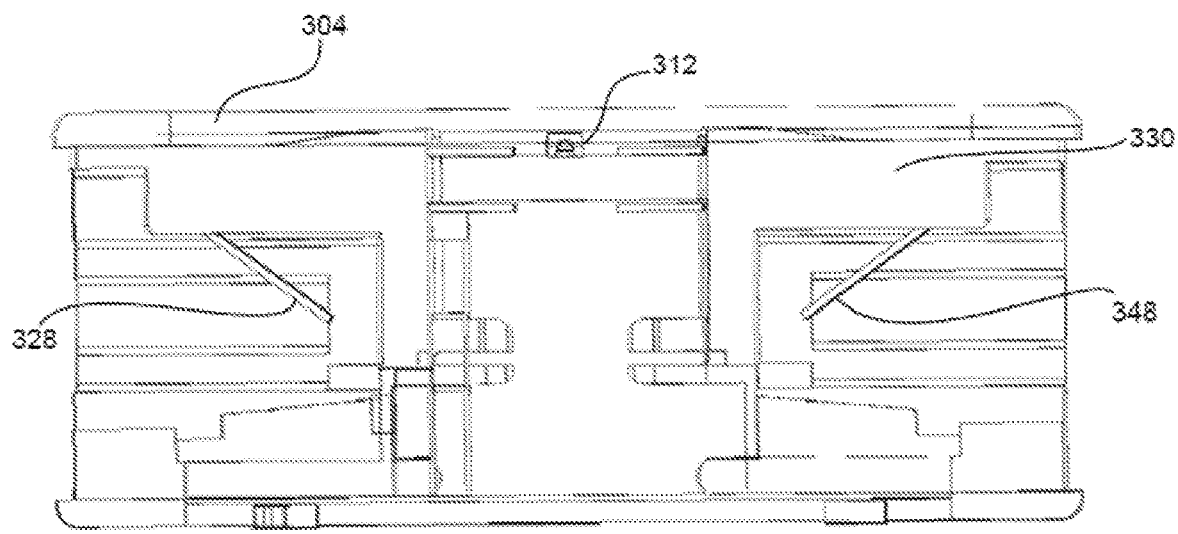
FIG. 3C illustrates a side cross-sectional view of a network cable connector according to one aspect of the present disclosure.
Figure 3D:
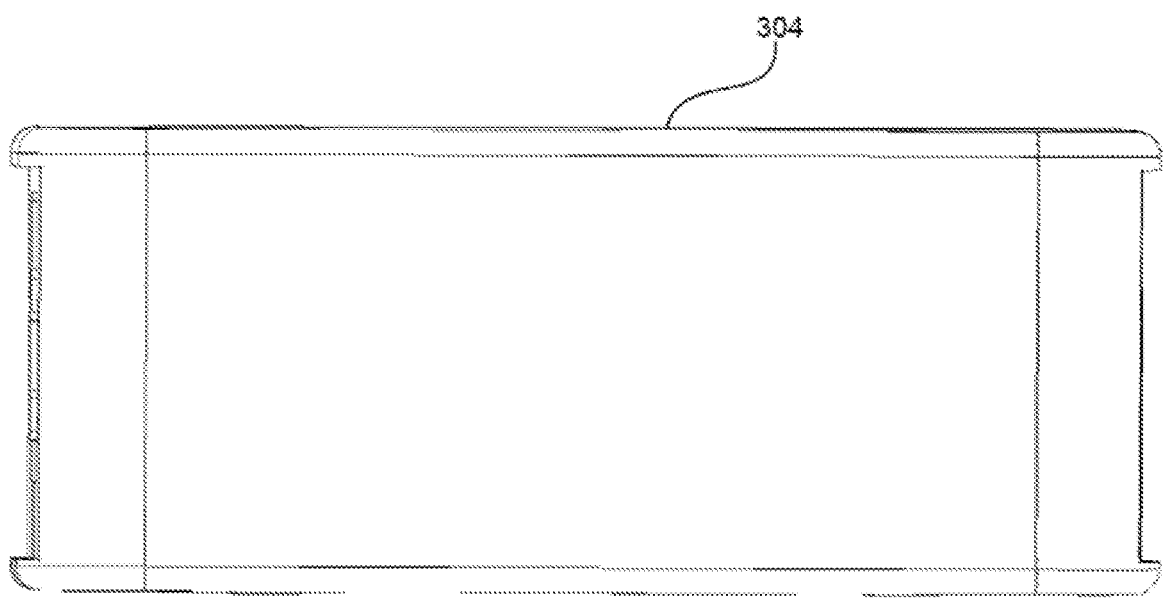
FIG. 3D illustrates a side view of a network cable connector according to one aspect of the present disclosure.
Figure 3E:
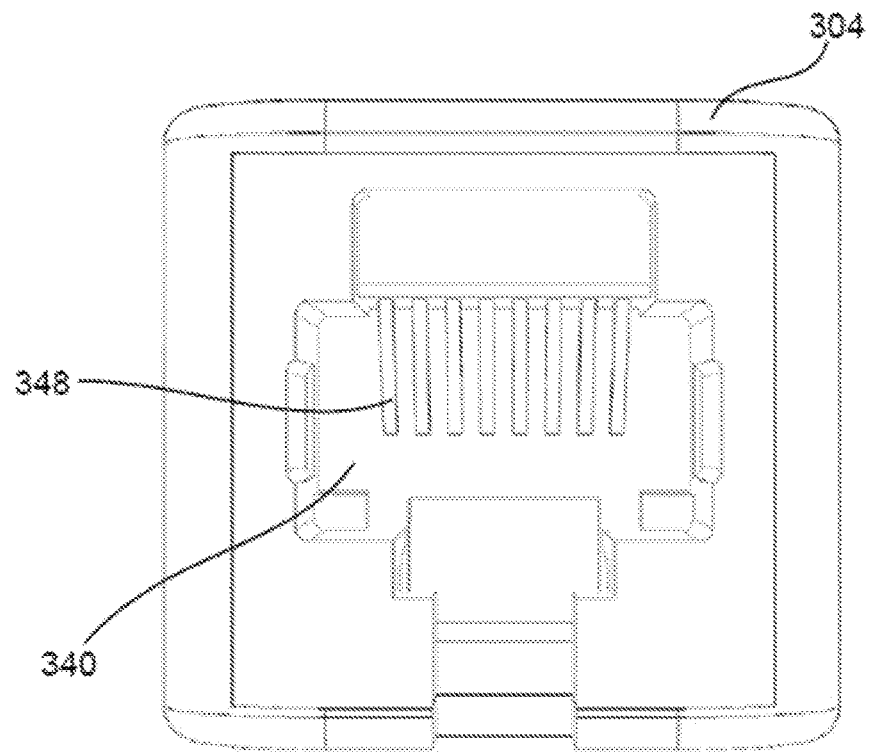
FIG. 3E illustrates a back view of a network cable connector according to one aspect of the present disclosure.
Figure 3F:
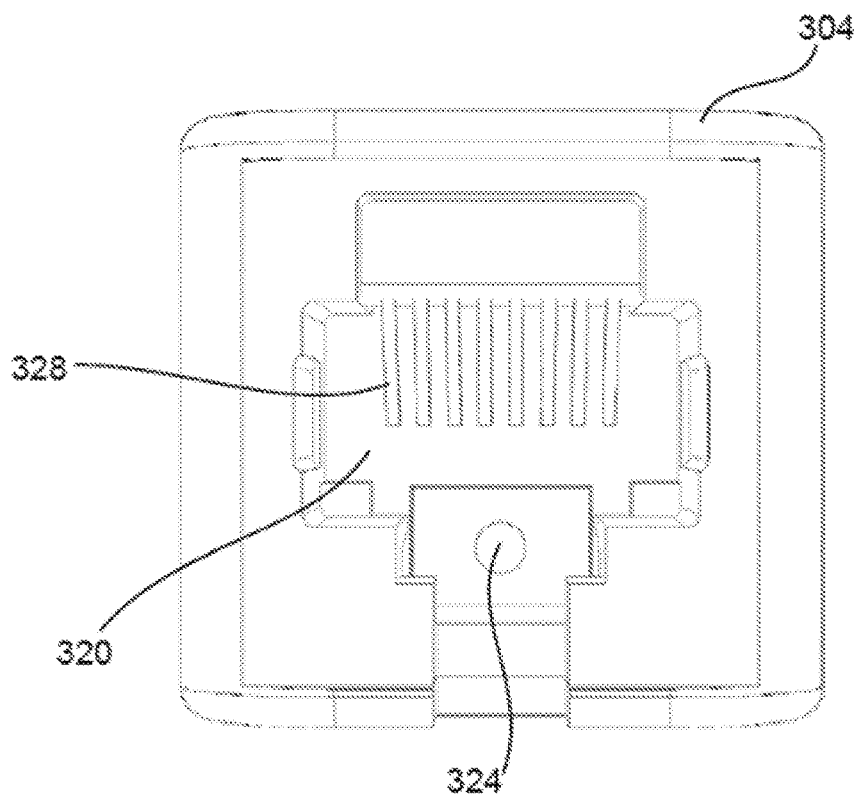
FIG. 3F illustrates a front view of a network cable connector according to one aspect of the present disclosure.
Figure 3G:
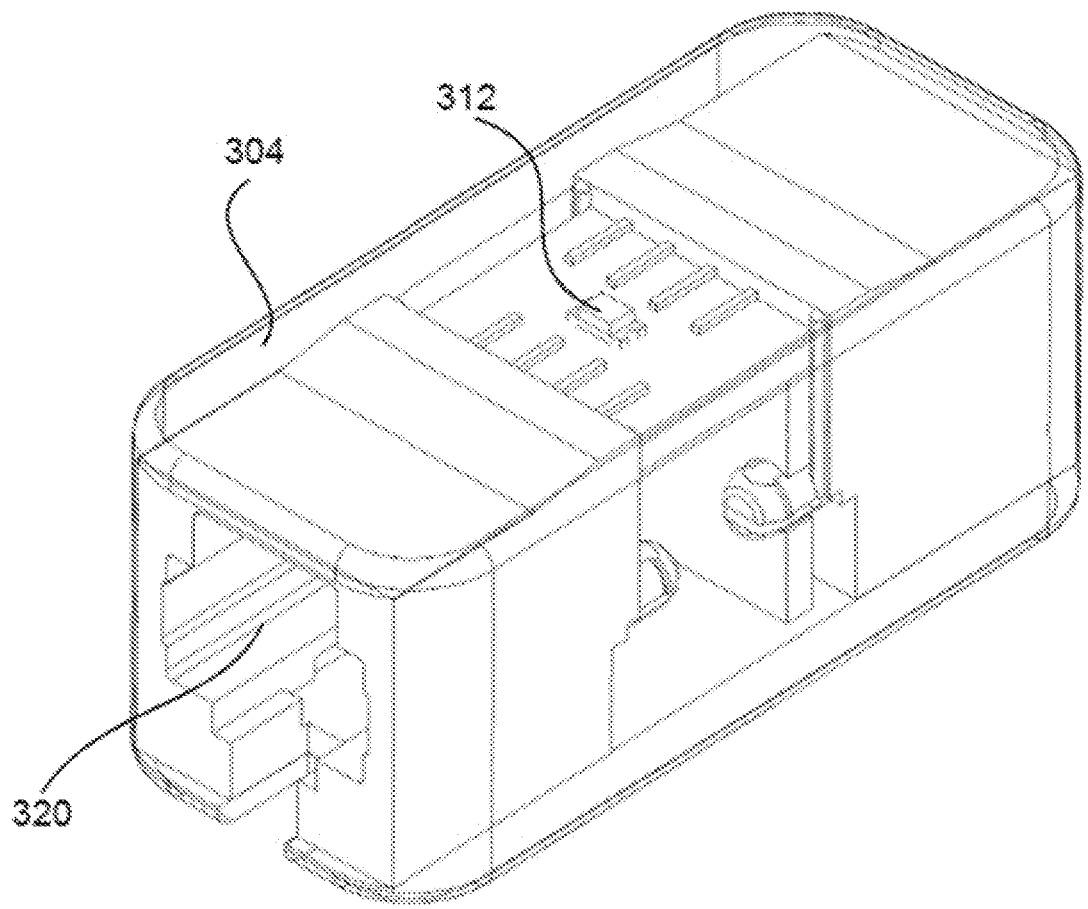
FIG. 3G illustrates a front, upper cross-sectional view of a network cable connector according to one aspect of the present disclosure.

FIGS. 3A-3G depict an embodiment of a network cable connector 300 that may be used in the networked environment of FIG. 1 or other similar networked environment. FIGS. 3A-3G each illustrates a different view of network cable connector 300. FIG. 3A illustrates a front, upper perspective view, FIG. 3B illustrates a back, lower perspective view, FIG. 3C illustrates a side cross-sectional view, FIG. 3D illustrates a side view, FIG. 3E illustrates a back view, FIG. 3F illustrates a front view, and FIG. 3G illustrates a front, upper cross-sectional view. As shown, network cable connector 300 is configured as a coupler to couple two network cables. For example, network cable connector 200 may include or correspond to network cable connector 190 or 192 of FIG. 1.

As depicted in FIGS. 3A-3G, network cable connector 300 includes a hood 304 (e.g., a housing) with a first opening 320 and a second opening 340 deposed on two sides of network cable connector 300. Although first opening 320 and second opening 340 are shown as being on opposite sides of network cable connector 300, in other implementations, first opening 320 and second opening 340 may be positioned on adjacent sides or the same side of network cable connector 300.

First opening 320 and second opening 340 may each be configured to receive a plug, such as a network cable plug. A first array of contact pins 328 and a second array of contact pins 348 may be coupled to two different sides of printed circuit 330. First contact pins 238 may be exposed to first opening 320 and configured to be coupled to a plug inserted into first opening 320. Second contact pins 348 may be exposed to second opening 340 and configured to be coupled to a plug inserted into second opening 340. In some embodiments, first and contact pins 328, 348 may each include 8 pins, making network cable connector 300 compatible with 8P8C connector interfaces, such as RJ-45, RJ-48, or RJ-61 interfaces. In some embodiments, first and second contact pins 328, 348 may each include 10 pins, making network cable connector 300 compatible for 10P10C connector interfaces, such as RJ-50 interfaces. Thus, network cable connector 300 may configured to connect one device to another, like cable connectors 150, 160 on panel 120 or hubs 112, 116 described in FIG. 1.

Devices connected by network cable connector 300 may be external power sources, networking devices (such as routers, hubs, panels, etc.), computers, printers, storage devices, etc., as illustrative, non-limiting examples. For example, network cable connector 300 may be connected to a POE PD through first opening 320 and to a PSE through second opening 340, such that the PD may request power from PSE over Ethernet cables. In some implementations, first opening 320 may be designated and/or configured to be coupled to PSE and second opening 340 may be designated and/or configured to be coupled to PD. Alternatively, in other implementations, first opening 320 may be designated and/or configured to be coupled to PD and second opening 340 may be designated and/or configured to be coupled to PSE. In a particular implementation, network cable connector 300 is configured such that either of first opening 320 and second opening 340 may be coupled to PSE while the other is coupled to PD.

A printed circuit 330, as shown in FIG. 3C, may be housed in hood 304 of network cable connector 300. Printed circuit 330 may have a similar layout, circuitry, and/or functionality as printed circuit 500 shown and described with reference to FIG. 5. Printed circuit 330 may include a flex circuit and/or may be included in a printed circuit board. In a particular implementation, printed circuit 330 includes a flexible circuit or flex circuit that is affixed to and/or molded into hood 304.

Network cable connector 300 may also include a switch 324 incorporated into hood 304. As shown, switch 324 may be exposed to first opening 320. In some embodiments, switch 324 may be configured to be easily detached from hood 304 and replaced. For example, switch 324 may be a modular component (having electrical contacts) that can be physically coupled and decoupled to hood 304 (having corresponding electrical contacts). Switch 324 may include any type of switch, such as a wirelessly operated switch, a push button switch, a toggle switch, a manual switch, an electromechanical switch, etc., as illustrative non-limiting examples. In an implementation where switch 324 is a wirelessly operated switch, printed circuit 330 may include wireless communication/control circuitry.

Switch 324 may be coupled to printed circuit 330 and configured to connect one or more components of the printed circuit to another device, or disconnect such one or more components from the device. Switch 324 may be manually operated by pressing, for example, pressed with a finger or pressed by a plug when the plug is inserted into first opening 320. The connecting and/or disconnecting of one or more components of the printed circuit via the operation of switch 324 is similar to the operation of switch 524 in FIG. 5 described below. In some implementations, switch 324 may be positioned on hood 304 outside of first opening. To illustrate, switch 324 may be located on surface of hood 304 that corresponds to opening 320 or on another surface of hood 304. In such an implementation, switch 224 may be manually actuated during insertion of a plug, via first opening 320 and/or second opening 304, into network cable connector 300.

In some implementations, network cable connector 300 may include a second switch (not shown) that is incorporated into hood 304. For example, the second switch may be exposed to second opening 340. In some embodiments, second switch may be configured to be easily detached from hood 304 and replaced. For example, second switch may be a modular component (having electrical contacts) that can be physically coupled and decoupled to hood 304 (having corresponding electrical contacts). Second switch may be coupled to printed circuit 330 and configured to connect one or more components of the printed circuit to another device, or disconnect such one or more components from the device. Second switch may be manually operated by pressing, for example, pressed with a finger or pressed by a plug when the plug is inserted into second opening 340. The connecting and/or disconnecting of one or more components of the printed circuit via the operation of second switch is similar to the operation of switch 524 in FIG. 5 described below.

Network cable connector 300 may include a display 312 integrated into hood 304. In some embodiments, display 312 may be configured to be easily detached from hood 304 and replaced. In the depicted embodiment, display 312 is hidden under a surface of hood 304. Alternatively, display 312 may protrude above a surface of hood 304. Display 312 may be a light emitting diode (LED) display, an alphanumeric display, or the like. Display 312 may be configured to display information relevant to network cable connector 300, such as connector operating status, IP address, MAC address, power status, type of equipment coupled to connector 300, location of a far end device, connector security settings, security lock-out status, etc. The information may be obtained by printed circuit 330 and then transmitted to display 312. When display 312 is hidden under a surface of hood 304, the displayed information may be indicated by an on/off status, a color, a blinking pattern, or the like of display 312. Although network cable connector 300 is shown as having a single display 312, in other implementations, network cable connector 300 may include multiple displays.

Figure 4A:
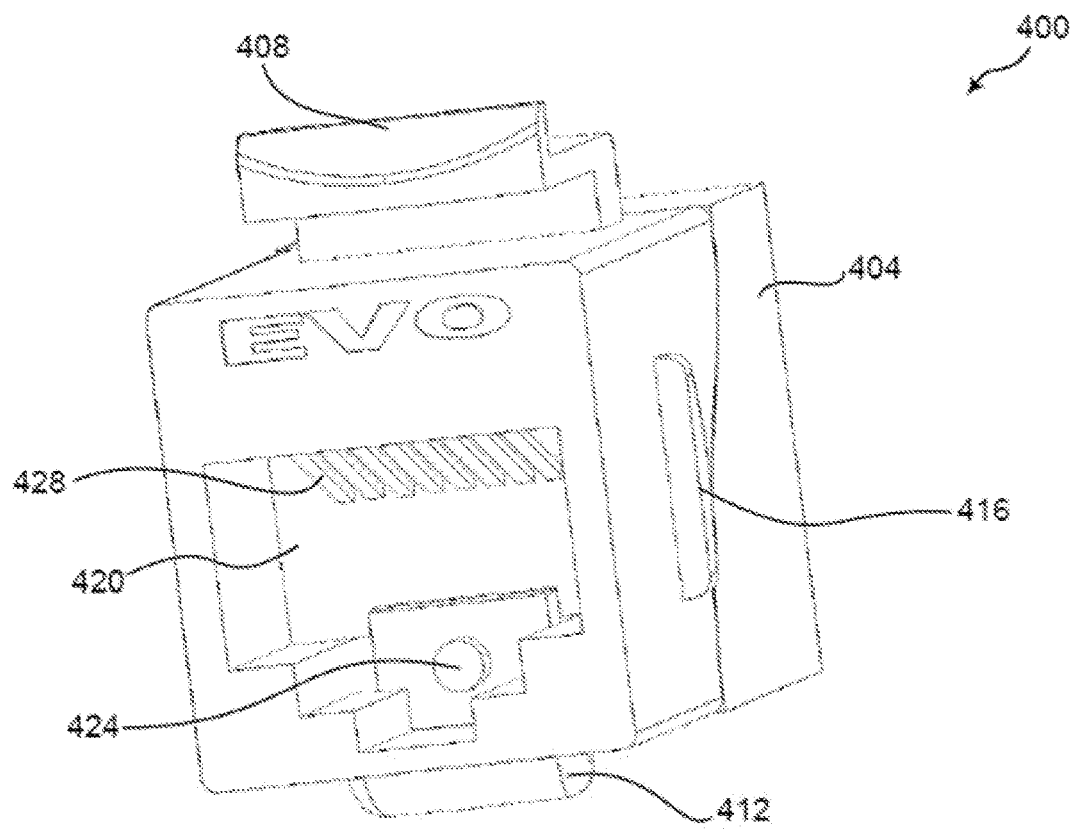
FIG. 4A illustrates a front, upper perspective view of a network cable connector according to one aspect of the present disclosure.
Figure 4B:
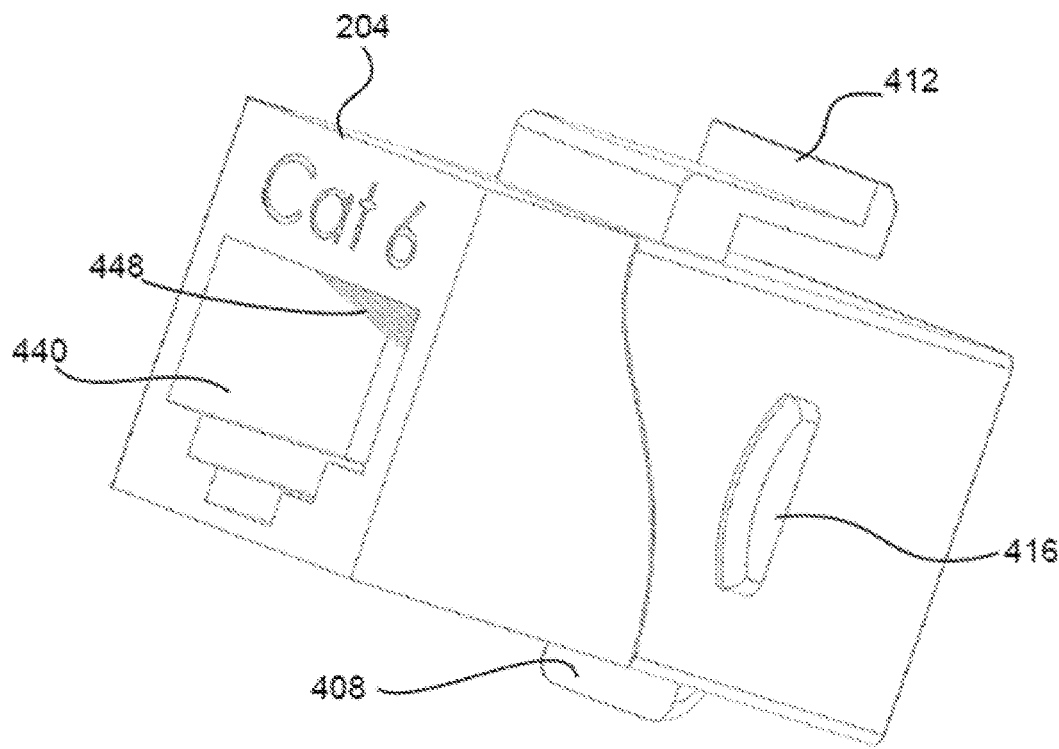
FIG. 4B illustrates a back, lower perspective view of a network cable connector according to one aspect of the present disclosure.
Figure 4C:
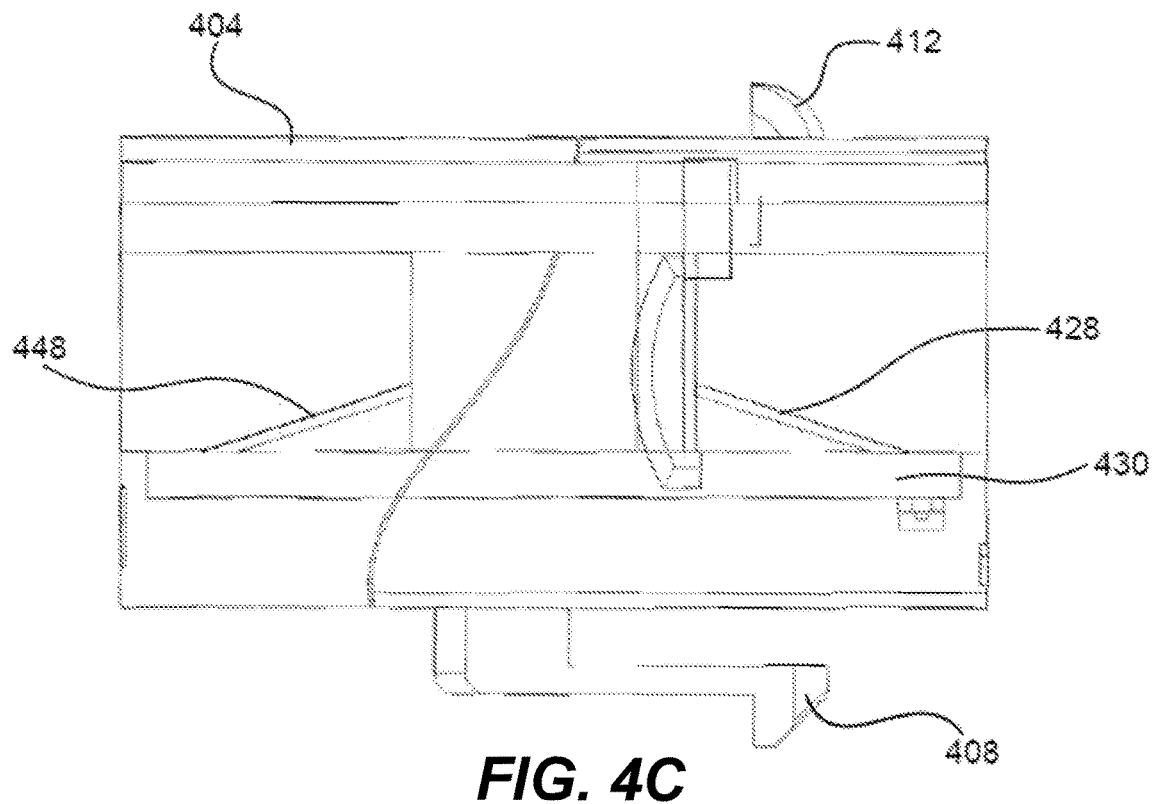
FIG. 4C illustrates a side cross-sectional view of a network cable connector according to one aspect of the present disclosure.
Figure 4D:
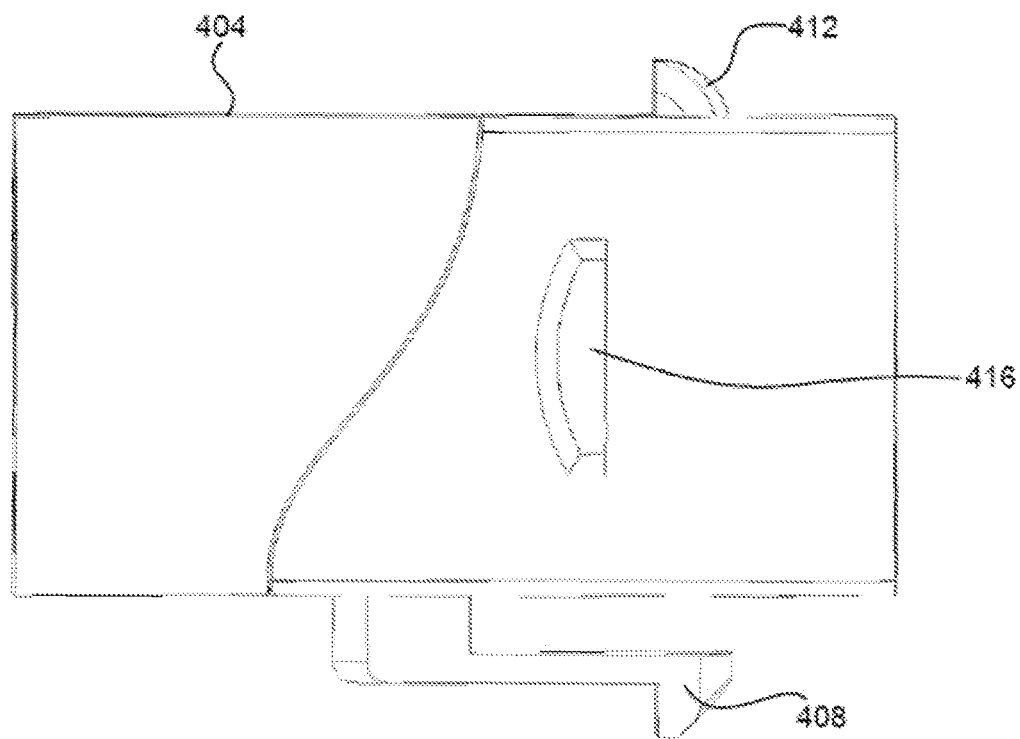
FIG. 4D illustrates a side view of a network cable connector according to one aspect of the present disclosure.
Figure 4E:
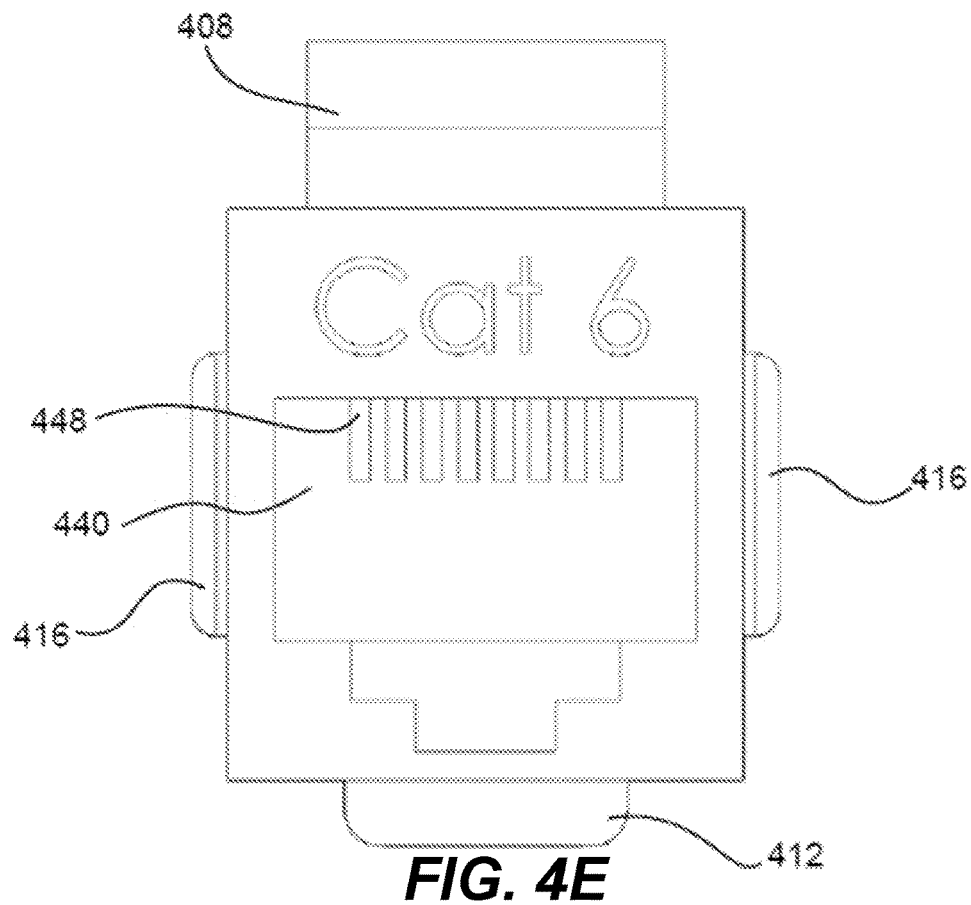
FIG. 4E illustrates a back view of a network cable connector according to one aspect of the present disclosure.
Figure 4F:
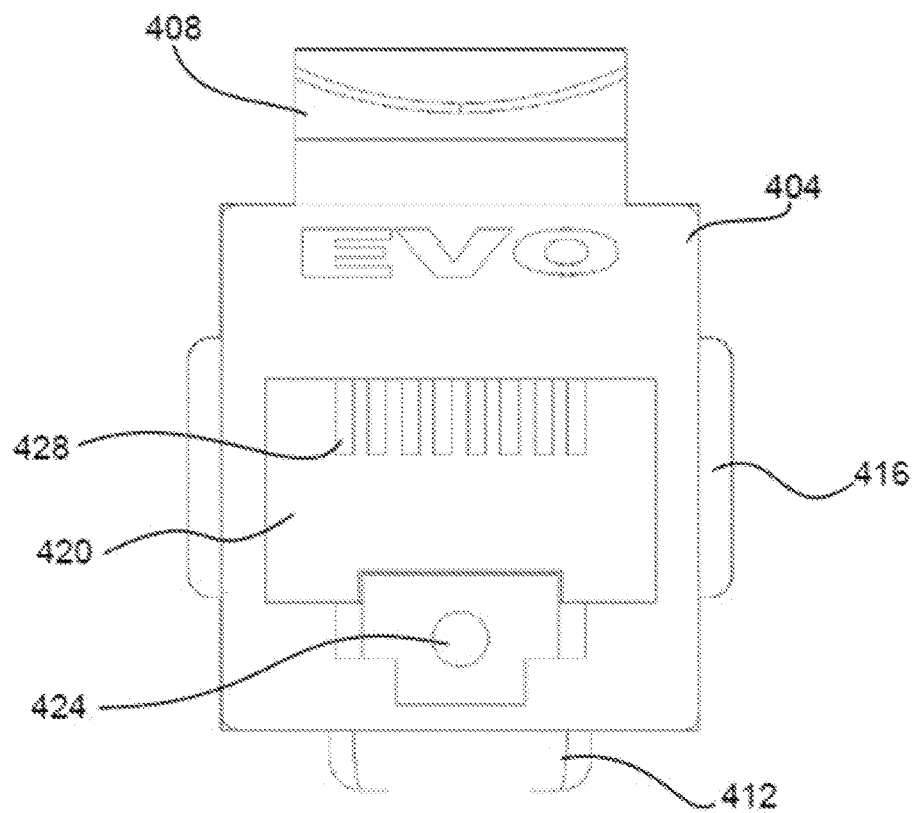
FIG. 4F illustrates a front view of a network cable connector according to one aspect of the present disclosure.

FIGS. 4A-4F depict an embodiment of a network cable connector 400 that may be used in the networked environment of FIG. 1 or other similar networked environment. FIGS. 4A-4F each illustrates a different view of network cable connector 400. FIG. 4A illustrates a front, upper perspective view, FIG. 4B illustrates a back, lower perspective view, FIG. 4C illustrates a side cross-sectional view, FIG. 4D illustrates a side view, FIG. 4E illustrates a back view, and FIG. 4F illustrates a front view. As shown, network cable connector 400 is configured as a coupler to couple two network cables. For example, network cable connector 400 may include or correspond to network cable connector 150, 160, 170, 190 or 192 of FIG. 1.

As depicted in FIGS. 4A-4F, connector 400 includes a hood 404 (e.g., housing) with a first opening 420 and a second opening 440 deposed on two sides connector 400. Although first opening 420 and second opening 440 are shown as being on opposite sides of network cable connector 400, in other implementations, first opening 420 and second opening 440 may be positioned on adjacent sides or the same side of network cable connector 400. In some implementations, network cable connector 400 may include or correspond to a keystone coupler.

First opening 420 and second opening 440 may each be configured to receive a plug, such as a network cable plug. A first array of contact pins 428 and a second array of contact pins 448 may be coupled to two different sides of printed circuit 430. First contact pins 438 may be exposed to first opening 420 and configured to be coupled to a plug inserted into first opening 420. Second contact pins 448 may be exposed to second opening 440 and configured to be coupled to a plug inserted into second opening 440. In some embodiments, first and contact pins 328, 348 may each include 8 pins, making network cable connector 400 compatible with 8P8C connector interfaces, such as RJ-45, RJ-48, or RJ-61 interfaces. In some embodiments, first and second contact pins 428, 448 may each include 10 pins, making network cable connector 400 compatible for 10P10C connector interfaces, such as RJ-50 interfaces. Thus, network cable connector 400 may configured to connect one device to another, like cable connectors 150, 160 on panel 120 or hubs 112, 116 described in FIG. 1.

Devices connected by network cable connector 400 may be external power sources, networking devices (such as routers, hubs, panels, etc.), computers, printers, storage devices, etc., as illustrative, non-limiting examples. For example, network cable connector 300 may be connected to a POE PD through first opening 420 and to a PSE through second opening 440, such that the PD may request power from PSE over Ethernet cables. In some implementations, first opening 420 may be designated and/or configured to be coupled to PSE and second opening 440 may be designated and/or configured to be coupled to PD. Alternatively, in other implementations, first opening 420 may be designated and/or configured to be coupled to PD and second opening 440 may be designated and/or configured to be coupled to PSE. In a particular implementation, network cable connector 400 is configured such that either of first opening 420 and second opening 440 may be coupled to PSE while the other is coupled to PD.

In some embodiments, network cable connector 400 may be configured as a wall jack (e.g., receptacle). For example, network cable connector 400 may be attached to a plate (e.g., 194). Network cable connector 400 may include a clip 408 configured to lock the connector when inserted into a wall plate or other devices, such as a hub, a router, a panel, etc. Network cable connector 400 may further include one or more side latches 416 to secure the connector to another device, such as a wall plate, a panel, a hub, etc.

A printed circuit 430, as shown in FIG. 4C, may be housed in hood 404 of network cable connector 400. Printed circuit 430 may have a similar layout, circuitry, and/or functionality as printed circuit 500 shown and described with reference to FIG. 5. Printed circuit 430 may include a flex circuit and/or may be included in a printed circuit board. In a particular implementation, printed circuit 430 includes a flexible circuit or flex circuit that is affixed to and/or molded into hood 404.

Network cable connector 400 may also include a switch 424 incorporated into hood 404. As shown, switch 424 may be exposed to first opening 420. In some embodiments, switch 424 may be configured to be easily detached from hood 404 and replaced. For example, switch 424 may be a modular component (having electrical contacts) that can be physically coupled and decoupled to hood 204 (having corresponding electrical contacts). Switch 424 may include any type of switch, such as a wirelessly operated switch, a push button switch, a toggle switch, a manual switch, an electromechanical switch, etc., as illustrative non-limiting examples. In an implementation where switch 424 is a wirelessly operated switch, printed circuit 430 may include wireless communication/control circuitry.

Switch 424 may be coupled to printed circuit 430 and configured to connect one or more components of printed circuit 430 to another device, or disconnect such one or more components from the device. Switch 424 may be manually operated by pressing, for example, pressed with a finger or pressed by a plug when the plug is inserted into first opening 420. The connecting and/or disconnecting of one or more components of the printed circuit via the operation of switch 424 is similar to the operation of switch 524 in FIG. 5 described below. In some implementations, switch 224 may be positioned on hood 204 outside of first opening. To illustrate, switch 224 may be located on surface 292 of hood 204. In such an implementation, switch 224 may be manually actuated during insertion of a plug, via first opening 220, into network cable connector 200.

Network cable connector 400 may include a display 412 integrated into hood 404 and coupled to printed circuit 430. In some embodiments, display 412 may be configured to be easily detached from hood 404 and replaced. Display 412 may be a light emitting diode (LED) display, an alphanumeric display, or the like. Display 412 may be configured to display information relevant to network cable connector 400, such as connector operating status, IP address, MAC address, power status, type of equipment coupled to connector 400, location of a far end device, connector security settings, security lock-out status, etc. The information may be obtained by printed circuit 430 and then transmitted to display 412. In some implementations, display 212 may be positioned on surface 292 of hood 204. In a particular implementation, both display 212 and switch 224 are positioned on surface 292. In yet another implementation, display 212 and switch 224 may be configured such that switch is actuated by touching or pressing display 212.

Figure 5:
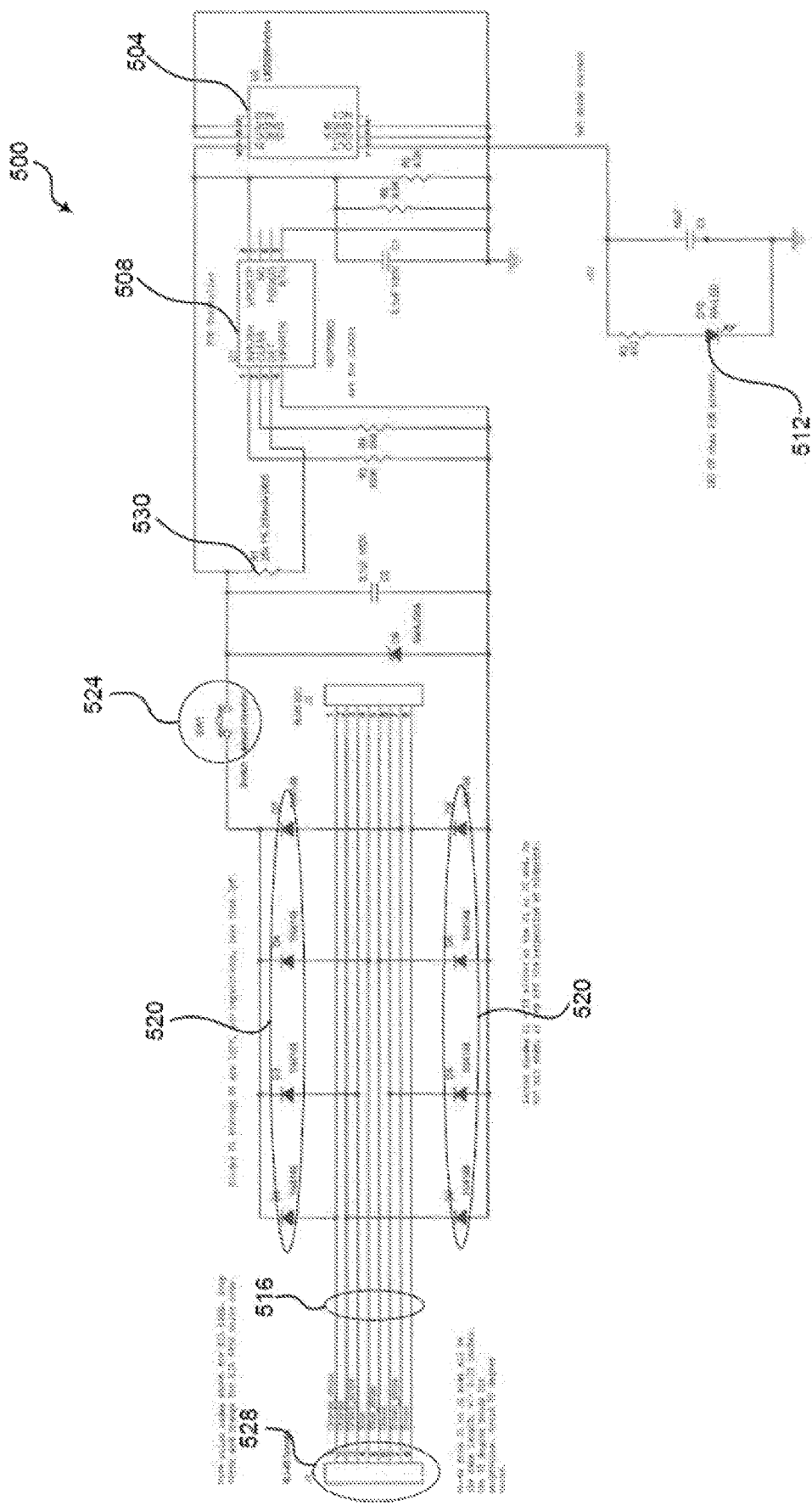
FIG. 5 illustrates a circuit diagram of a printed circuit for network cable connector according to one aspect of the present disclosure.

FIG. 5 illustrates a block diagram showing some components of printed circuit 500, which may be used in network cable connectors 200, 300, 400 described above in connection with FIGS. 2A-2F, 3A-3G, 4A-4F and network cable connectors described further herein at least with reference to FIGS. 10A-10B, 11A-11B, and 12A-12B. Printed circuit 500 may include a flex circuit and/or may be included in a printed circuit board. A flex circuit (e.g., a flexible printed circuit board) may include an insulating polymer film having one or more conductive circuit patterns affixed thereto and may include a coating (e.g., a polymer coating) to protect the conductor circuits. In a particular implementation, printed circuit 330 includes a flexible circuit or flex circuit that is affixed to and/or molded into a hood or plate.

In the depicted embodiment, printed circuit 500 may include controllers 504, 508 connected to each other. Controllers 504, 508 may be connected to one or more energy consuming components, such as resistor 530. Controllers 504, 508 and resistor 530 are in turn connected to contact pins 528 through a plurality of conductor wires 516, diodes 520, and switch 524. A display 512 is also connected to controllers 504, 508.

Printed circuit 500 may be connected to an external power source to provide power to printed circuit 500 and/or display 512. In some embodiments, the external power source may be a battery or a direct current (DC) power source. The external power source may also be a power over Ethernet (POE) power sourcing equipment (PSE) that is connected to printed circuit 500 through contact pins 528. Printed circuit 500 may be complaint with POE standards or technical specifications such as IEEE 802.3af, IEEE 802.3.at, Cisco Inline Power, etc., and configured to draw power from a POE PSE. When incorporated into a network cable connector (such as network cable connectors 200, 300, 400), the power drawn from a POE PSE by printed circuit 500 may be consumed wholly or partly by the network cable connector (e.g., by printed circuit 500 and/or display 512) and/or an external powered device (PD) connected to network cable connector (e.g., via an opening of the network cable connector). Switch 524 may connect or disconnect one or more component of printed circuit 500 to or from the external power source.

When the network cable connector including printed circuit 500 is active, at least one of controllers 504, 508 may be configured to obtain information relevant to the connector and display the all or part of the information on display 512. Such information may include operating status, IP address, MAC address, power status (e.g., whether POE is connected or other types of power source is connected), type of equipment connected to the connector, location of far end, connector security settings, security lock-out status, etc. In some implementations, printed circuit 500 may include one or more memories coupled to one or more processors, microprocessors, controllers, and/or ASICs. To illustrate, printed circuit 500 may include a memory storing executable instructions that is coupled to a processor that is configured to execute the instructions to perform and/or initiate one or more operations associated with the network cable connector that includes the printed circuit 500.

A network cable connector including printed circuit 500 (such as network cable connectors 200, 300, 400) may be operated as follows. The following example is described based on network cable connector 200 with printed circuit 500. First, network cable connector 200 with printed circuit 500 is connected to a POE PSE through a network cable via second opening 240. Switch 524 is closed and resistor 530 (which has a resistance of, e.g., 25 k Ohm when IEEE 802.3af standard is used) is connected to the POE PSE. Then printed circuit 500 starts to request power from the POE PSE using resistor 530. The power requested from the POE PSE may be for printed circuit 500 and/or display 512. Since printed circuit 500 includes components such as resistor 530 to consume energy from the PSE, the printed circuit 500 may be regarded as a powered device (PD). When an external PD is connected to network connector 200 through first opening 220, switch 524 may be operated to open, causing resistor 530 to be disconnected from the POE PSE. In this way, the external PD may request power from the POE PSE without the interference from resistor 530, which may otherwise be used to request power for network cable connector 200 when the external PD is requesting power. In some embodiments, switch 524 may be manually operated, e.g., by pressing the switch with a finger. Switch 524 may also be configured such that plugging an external PD into first opening 220 of network cable connector 200 automatically causes switch 524 to assume an open status.

In some embodiments, the ability to stop printed circuit 500 from requesting power from PSE when an external PD is connected not only reduces inference to the external PD but also reduces power consumption. For example, the IEEE 802.3af standard provides an option for a PD to inform the PSE of its power needs. PDs may be categorized according to their power needs. The IEEE 802.3af standard categorizes PDs in to several classes: class 0 needs 0.44 to 12.95 watts, class 1 needs 0.44 to 3.84 watts, class 2 needs 3.84 to 6.49 watts, and class 3 needs 6.49 to 12.95 watts. Generally, a PSE is required to provide a minimum power to a PD that is higher than the PD's maximum power needs. For example, for a PD of class 0, the PSE will provide up to 15.4 watts to the PD. Class 0 is the default state for a PSE when providing power to a PD, i.e., unless another classification is reported, the PSE will assume that the PD is class 0, and provide 15.4 watts to the PD. Thus, power consumption may be reduced if the PSE learns the PD's power classification and adjust the power output to the PD accordingly. The PSE learns the class of a connected PD by transmitting a voltage to the PD (e.g., on a power positive pair of the plurality of conductor wires connecting the PSE and PD), and measuring the attenuation of the voltage (e.g., on a power negative pair of the plurality of conductor wires connecting the PSE and PD). The PSE will then classify the PD based on the voltage level of the returned signal. Therefore, before or upon an external PD is connected to network cable connector 200, disconnecting some components of printed circuit 500 (such as resistor 530, which is used by printed circuit 500 to request power from the PSE) from the PSE by switch 524 may allow the PSE to correctly classify the external PD. The PSE may then adjust the power to be supplied to the PD according to the classification and power may be saved.

Further, disconnecting some components of printed circuit 500 (such as resistor 530, which is used by printed circuit 500 to request power from the PSE) from the PSE by switch 524 may allow the PSE to correctly detect that an external PD has been disconnected from network cable connector 200. Under the IEEE 802.3af standard, the PSE disconnects power to a PD when the PSE stops receiving a power signature from the PD. Thus, if the PSE is supplying a power of 15.4 watts to an external PD of class 0, and resistor 530 is connected to the PSE through switch 524 (i.e., the switch is closed), PSE may not correctly determine that the external PD is disconnected because the PSE may continue to receive a power signature from printed circuit 500 and thus continue to supply 15.4 watts to network cable connector 200.

It should also be noted that in some embodiments, the methods described below may not comprise every step set in the following flow charts. Rather, in some embodiments, the method described below may comprise a subset of the steps set forth in the flow charts and the steps may be in a different order than the order presented in the flow charts.

Figure 6:
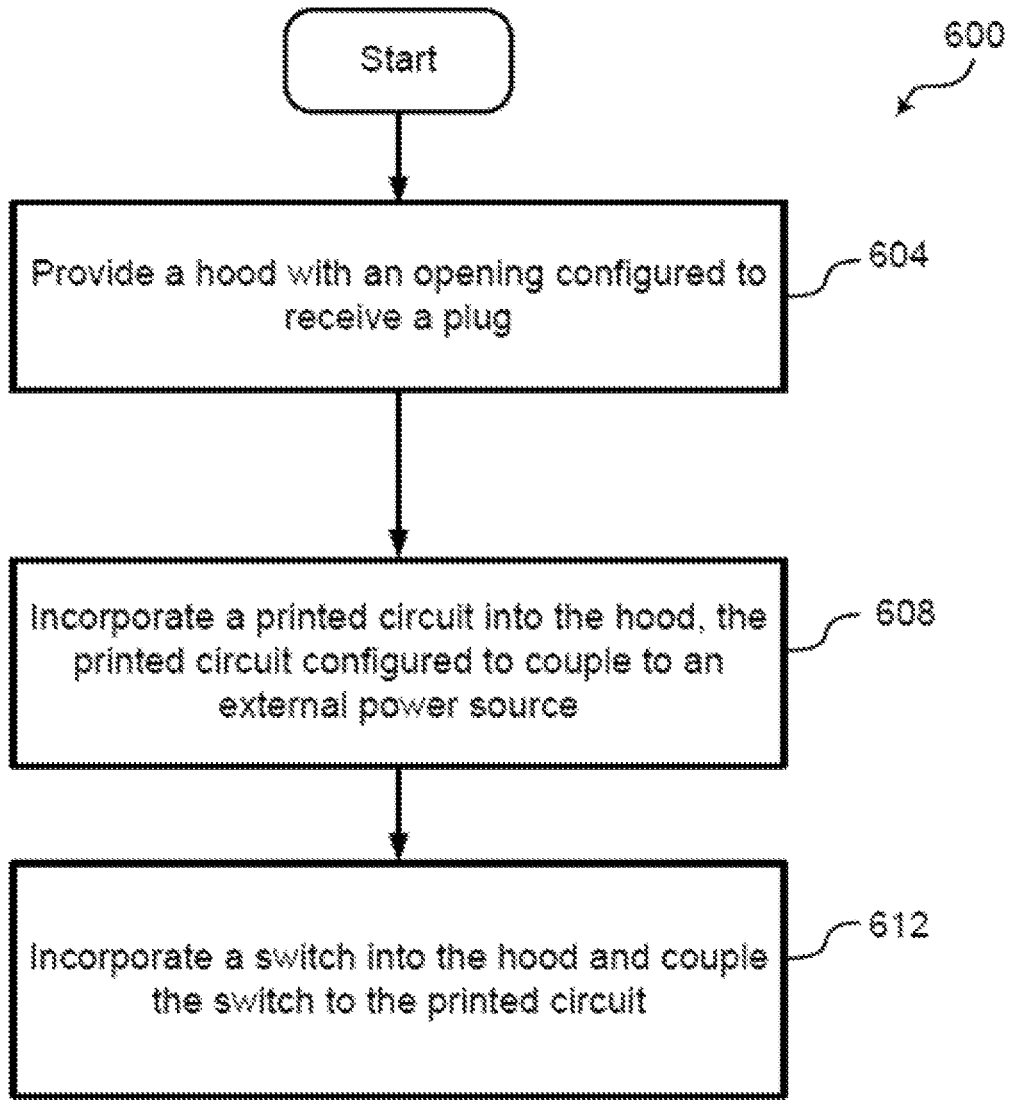
FIG. 6 illustrates a flow chart for a method for making a network cable connector according to one aspect of the present disclosure.

FIG. 6 illustrates one embodiment of a method 600 for making a network cable connector according to one aspect of the disclosure. The network cable connector may include or correspond to one of network cable connectors 200, 300, 400 described above in connection with FIGS. 2A-2F, 3A-3G, 4A-4F and/or network cable connectors described further herein at least with reference to FIGS. 10A-10B, 11A-11B, and 12A-12B. In the depicted embodiment, step 604 provides a hood (or plate) with an opening configured to receive a plug. The plug may be a RJ-45, RJ-48, RJ-50, or RJ-61 plug. The hood may include an additional opening to receive a cable connecting the cable connector to another device. Step 608 incorporates a circuit (e.g., a printed circuit) into the hood. The printed circuit may be configured to connect to an external power source through one or more conductor wires. The external power source may be a POE PSE, a battery, and/or a DC power source. Step 612 incorporates a switch into the hood and couples the switch to the printed circuit. The switch may be operated to connect or disconnect one or more components of the printed circuit to or from the external power source.

In some embodiments, method 600 may also include incorporating a display into the hood and coupling the display to the printed circuit. The display may be configured to display information relevant to the network cable connector, such as the information described above in connection with FIGS. 2A-2F, 3A-3G, 4A-4F. The information may be obtained by the printed circuit and transmitted to the display. The printed circuit may be configured to request power for the display from the external power source, which may be a POE PSE.

Figure 7:
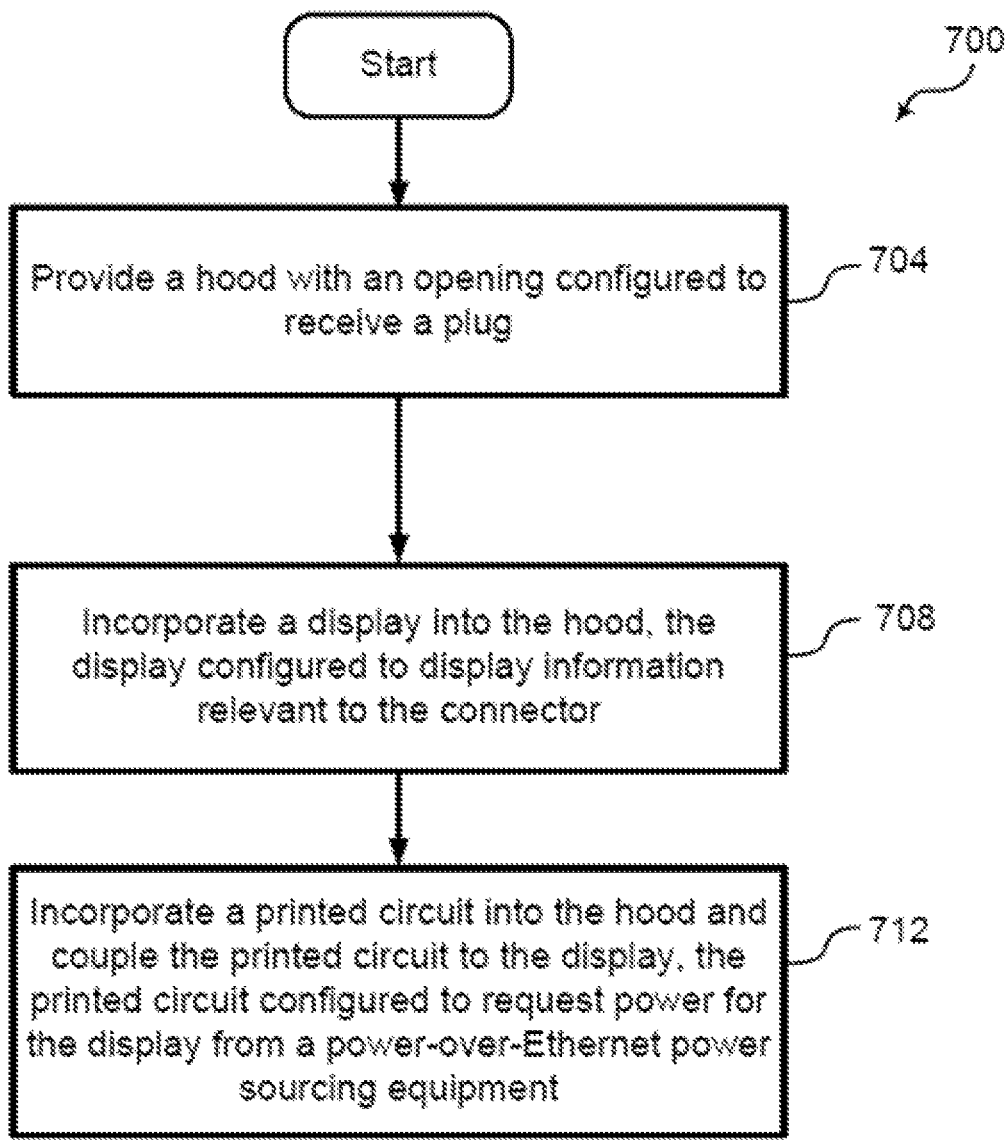
FIG. 7 illustrates a flow chart for a method for making a network cable connector according to one aspect of the present disclosure.

FIG. 7 illustrates one embodiment of a method 700 for making a network cable connector according to one aspect of the disclosure. The network cable connector may include or correspond to one of network cable connectors 200, 300, 400 described above in connection with FIGS. 2A-2F, 3A-3G, 4A-4F and/or network cable connectors described further herein at least with reference to FIGS. 10A-10B, 11A-11B, and 12A-12B. In the depicted embodiment, step 704 provides a hood (or plate) with an opening configured to receive a plug. The plug may be a RJ-45, RJ-48, RJ-50, or RJ-61 plug. The hood may include an additional opening to receive a cable connecting the cable connector to another device. Step 708 incorporates a display into the hood, where the display may be configured to display information relevant to the network cable connector, such as the information described above in connection with 2A-2F, 3A-3G, 4A-4F. Step 712 incorporates a printed circuit into the hood and couples the printed circuit to the display, where the printed circuit is configured request power for the display from a POE PSE. In some embodiment, method 700 may also include coupling a switch to the printed circuit, where the switch may be operated to connect or disconnect one or more components of the printed circuit to or from the POE PSE.

Figure 8:
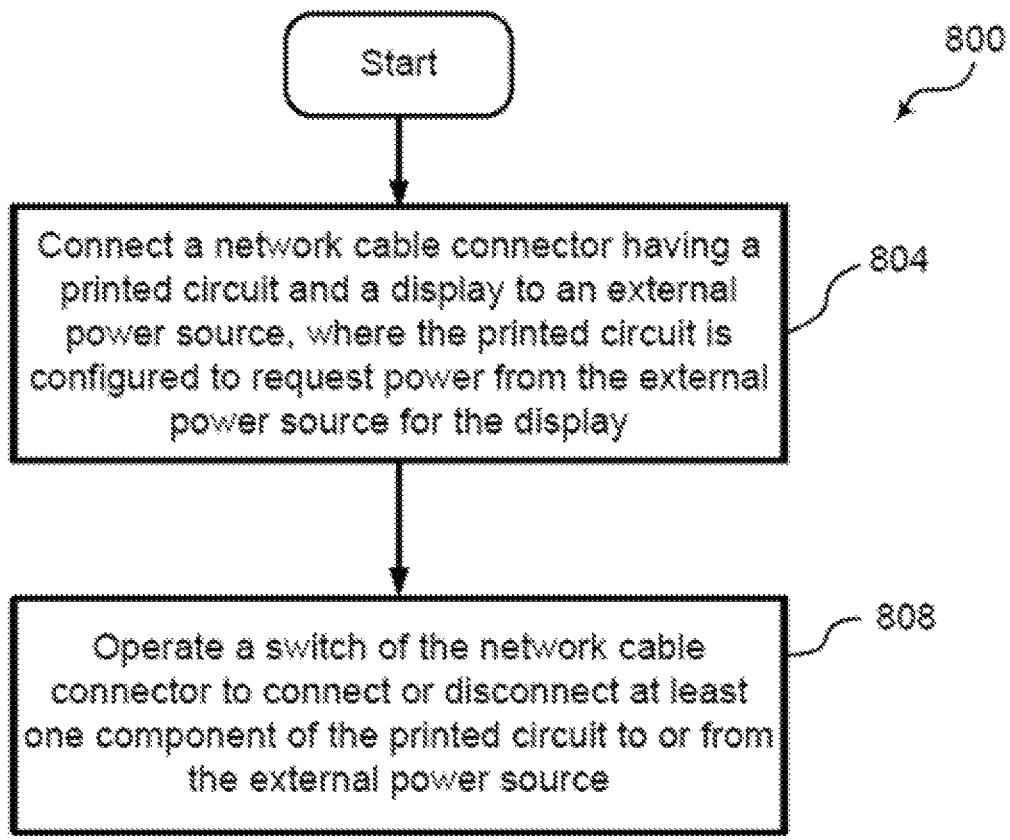
FIG. 8 illustrates a flow chart for operating a network cable connector according to one aspect of the present disclosure.

FIG. 8 illustrates one embodiment of a method 800 for operating a network cable connector according to one aspect of the disclosure. The network cable connector may include or correspond to one of network cable connectors 200, 300, 400 described above in connection with FIGS. 2A-2F, 3A-3G, 4A-4F and/or network cable connectors described further herein at least with reference to FIGS. 10A-10B, 11A-11B, and 12A-12B. In the depicted embodiment, step 804 connects the network cable connector having a circuit (e.g., a printed circuit) and a display to an external power source. The external power source may be a POE PSE, a battery, and/or a DC power source. The printed circuit is configured to request power from the external power source for the display, and the display is configured to display information relevant to the network cable connector. Step 808 operates a switch of the network cable connector to connect or disconnect one or more components of the printed circuit to or from the external power source. Operating the switch may include applying a force to the switch, e.g., by pressing. In some embodiment, inserting a plug into an opening of the network cable connector would automatically cause the switch to open and removing the plug from the opening may automatically cause the switch to close.

Figure 9:
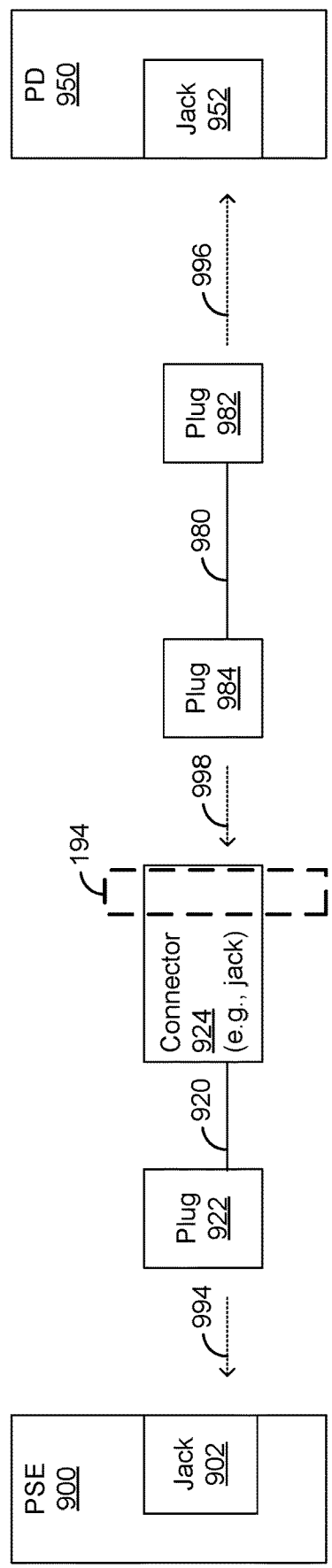
FIG. 9 illustrates a schematic view of another example of a networked computer environment.

Referring to FIG. 9, and example of a networked environment is shown. The networked environment may include or correspond to network environment 100. Network environment of FIG. 9 includes PSE 900 and PD 950. PSE 900 include jack 902 (e.g., network connector/interconnect) and PD 950 include jack 952 (e.g., network connector/interconnect).

A first network cable 920 includes include plug 922 (e.g., network connector/interconnect) and connector 924 (e.g., network connector/interconnect). First network cable 920 may include or correspond to network cable 178 or network cable 278. Connector 924 may include or correspond to network cable connector 190, 192, 200, or 400. In some implementations, jack 924 may include a coupler, such as network cable connector 300, into which a plug of network cable 920 is inserted. In some implementations, connector 924 is coupled (or mounted) to a plate (e.g., 194). For example, connector 924 may be coupled to or integrated with plate 194 as described further herein at least with reference to FIGS. 10A-10B, 11A-11B, and 12A-12B. A second network cable 980 includes plug 984 (e.g., network connector/interconnect) and plug 982 (e.g., network connector/interconnect). Second network cable 980 may include or correspond to cable 178 or cable 278.

In some implementations, one more of jacks 902, connector 924, and jack 952 may include a keystone jack. In implementations where connector 924 includes a coupler, connector 924 may include or correspond to a keystone coupler.

During operation, plug 922 is inserted into jack 902 as indicated by arrow 994. The connector 924 includes one or more components, such as a switch, a display, a printed circuit, and a connection hood (e.g., a hood). The connector 924, when coupled to PSE 900, may request and/or negotiate power with PSE 500.

Plug 982 of second network cable is inserted into jack 952 as indicated by arrow 996. After plug 982 is inserted in jack 952, plug 984 is inserted into connector 924, as indicated by arrow 998, while connector 924 is powered by PSE. Although described as plug 982 being plugged into jack 952 prior to plug 984 being plugged into connector 924, this is for illustration purposes only, and other sequences of coupling jacks, plugs, and connectors is possible.

A switch of the connector 924 may be operated such that at least one component of the connector 924 is disconnected from the PSE when plug 984 is connected to the cable connector. Disconnecting the at least one component may reduce the interference to the power negotiation between the PSE 900 and PD 950. The PSE 900 may then adjust the power to be supplied to the external PD 950. Because the circuitry (or a portion thereof) of the connector 924 is disconnected from the PSE 900 during power negotiation(s) between the PD 950 and PSE 900, the PSE 900 is able to determine/categorize a power need of the PD 950 without the circuitry (or portion thereof) of the connector 924. Therefore, disconnecting some components of the connector 924 from the PSE 900 (when coupling the PD 950 to the PSE) may allow the PSE to correctly classify the external PD. The PSE 900 may then adjust the power to be supplied to the external PD 950 according to the classification and power may be saved.

Further, disconnecting some components of connector 924 from the PSE 900 may allow the PSE 900 to correctly detect that external PD 950 has been disconnected from connector 924 (e.g., plug 984 is removed from connector 924 or plug 982 is removed from jack 952. To illustrate, the PSE 900 disconnects power to the PD 950 when the PSE 900 stops receiving a power signature from the PD 950 when the circuitry (or portion thereof, such as a resistor) of the connector 924 is in a disconnected state. If the circuitry (or portion thereof, such as a resistor) of the connector 924 were not disconnected (or otherwise bypassed) when the power signature from the PD 950 stops, the PSE 900 would continue to supply power to the connector 924 based on previous power negotiation between the PD 950 and the PSE 900.

Figure 10B:
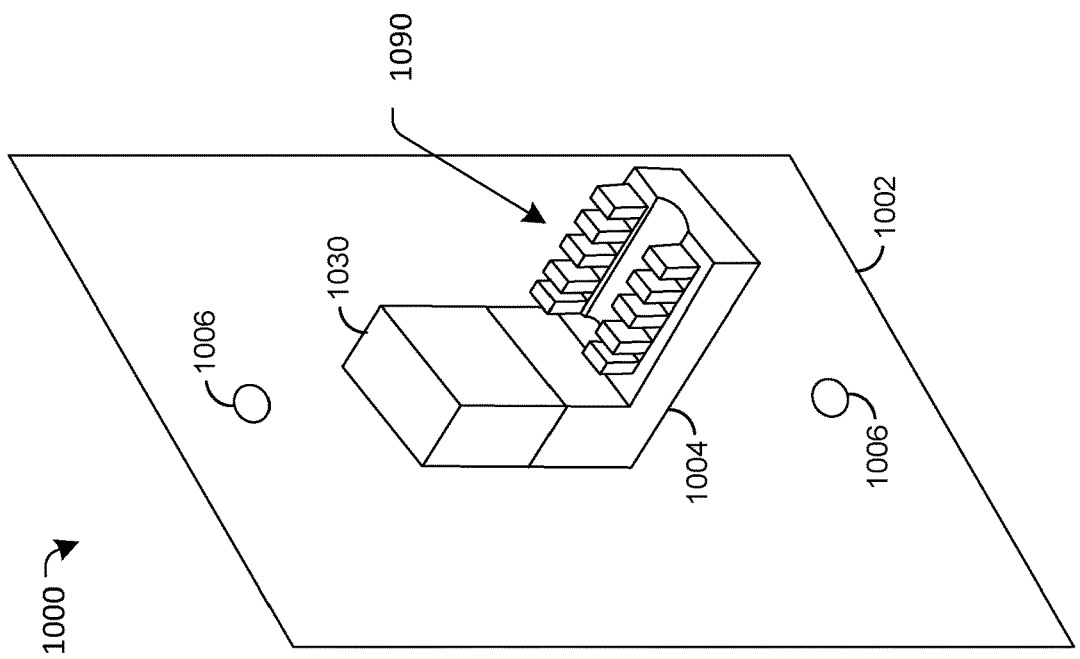
FIG. 10B illustrates a rear perspective view of the plate of FIG. 10A.
Figure 10A:
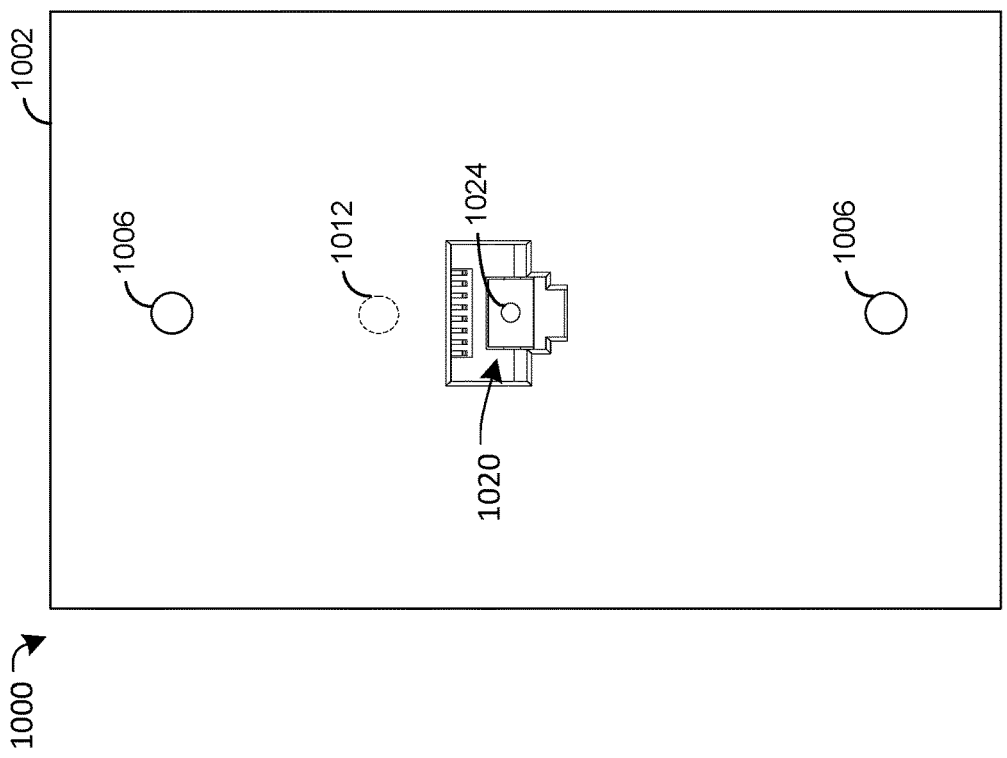
FIG. 10A illustrates a front view of a plate that includes a network cable connector according to one aspect of the present disclosure.

FIGS. 10A-10B depict an example of plate 1000 that includes a network cable connector, as described herein, that may be used in the networked environment of FIG. 1 or other similar networked environment. For example, plate 1000 may include or correspond to plate 194. FIGS. 10A-10B each illustrates a different view of plate 1000. FIG. 10A illustrates a front view and FIG. 10B illustrates a rear perspective view.

Plate 1000 includes a plate portion 1002 having mounting holes 1006 for mounting plate 1000 to a structure, such as a wall. Plate 1000 also includes an opening 1020 associated with a network cable connector. Opening 1020 is configured to receive and coupled to a network plug via contact pins of plate 1000. The pins of plate 1000 may include or correspond to contact pins 228, 328, 348, 428, 448, 528 as described herein. Plate 1000 may also include a switch 1024. Switch 1024 may include or correspond to switch 224, 324, 424, 524 as described herein. Plate 1000 includes printed circuit 1030 which is coupled to switch 1024. Printed circuit 1030 may include or correspond to printed circuit 230, 330, 430, 500 as described herein. Plate 1000 may optionally (as indicated by dashed circle) include a display 1012. Display 1012 may include or correspond to display 212, 312, 412, 512, as described herein.

Plate 1000 also includes body 1004 that is coupled to plate portion 1002. In a particular implementation, plate portion 1002 and body 1004 may include a single unitary component. Plate 1000 also includes wire connectors 1090. The wire connectors 1090 may include or correspond to connectors 260 as described herein and may be configured to be coupled to a network cable, such as network cable 178. The wire connectors 1090 may be electrically coupled to pins of plate 1000 that are accessible to a plug via the opening 1020.

Figure 11B:
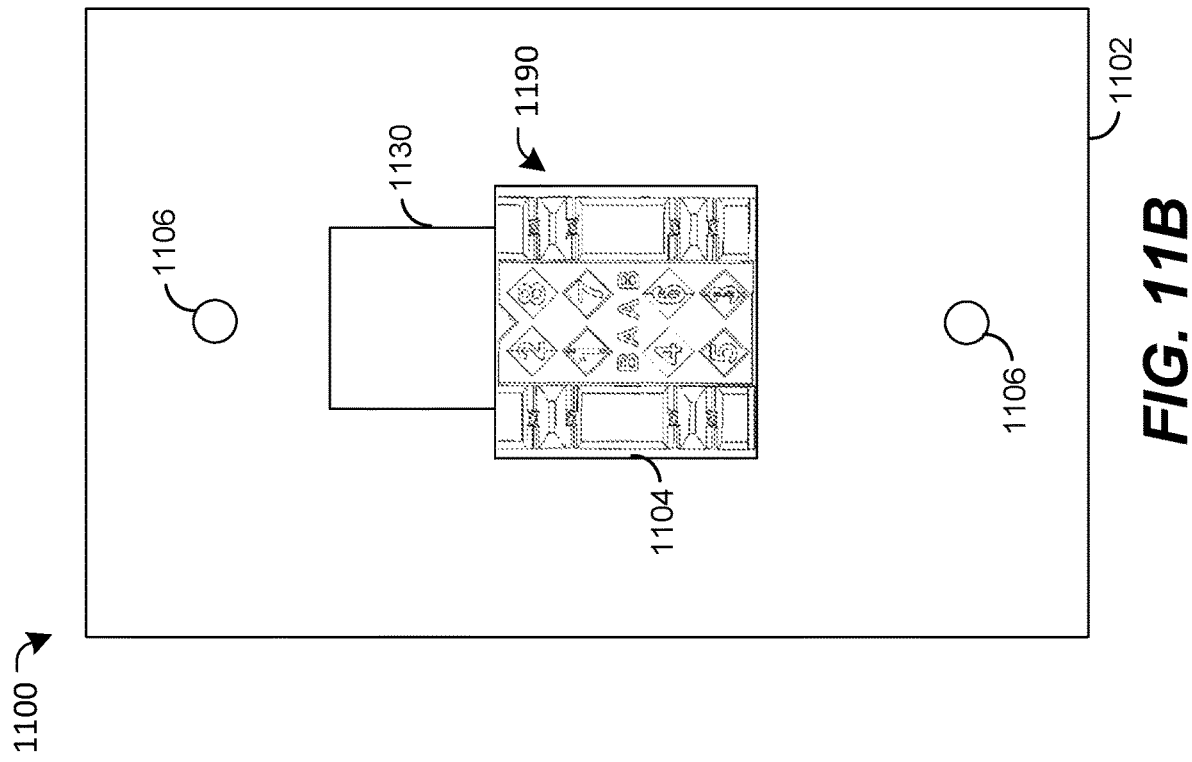
FIG. 11B illustrates a rear view of the plate of FIG. 11A.
Figure 11A:
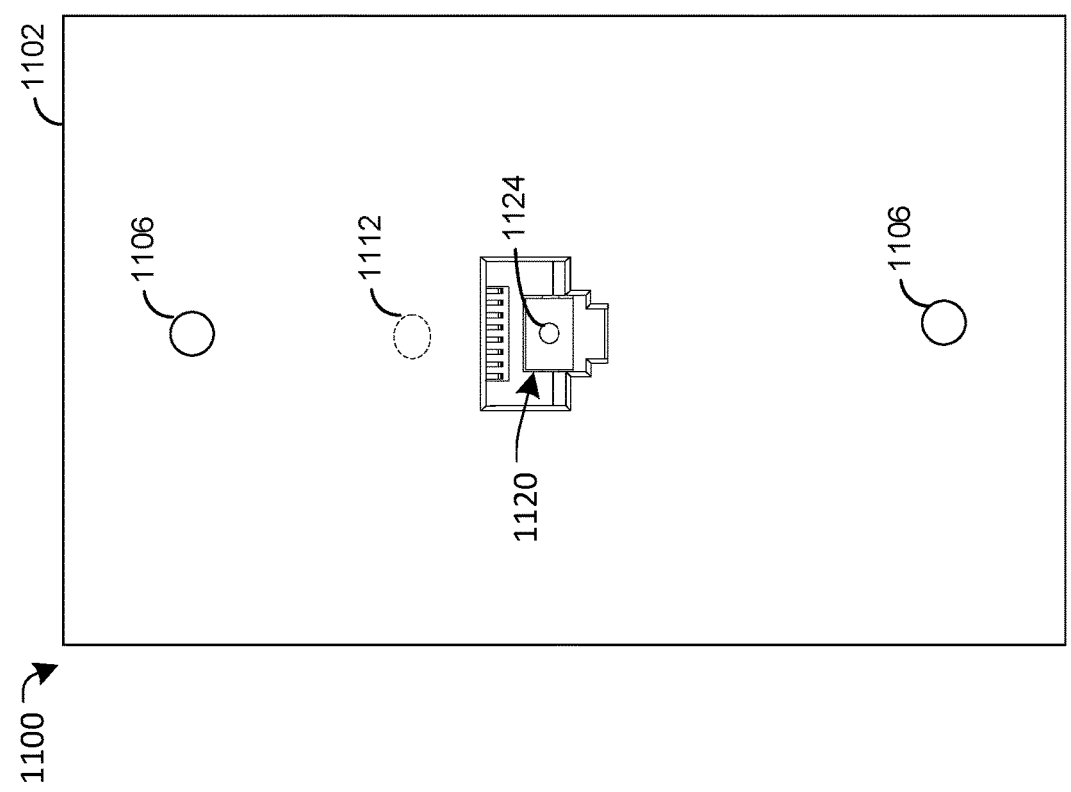
FIG. 11A illustrates a front view of a plate that includes a network cable connector according to one aspect of the present disclosure.

FIGS. 11A-11B depict an example of plate 1100 that includes a network cable connector, as described herein, that may be used in the networked environment of FIG. 1 or other similar networked environment. For example, plate 1100 may include or correspond to plate 194. FIGS. 11A-11B each illustrates a different view of plate 1100. FIG. 11A illustrates a front view and FIG. 11B illustrates a rear view.

Plate 1100 includes a plate portion 1102 having mounting holes 1106 for mounting plate 1100 to a structure, such as a wall. Plate 1100 also includes an opening 1120 associated with a network cable connector. Opening 1120 is configured to receive and coupled to a network plug via contact pins of plate 1100. The pins of plate 1100 may include or correspond to contact pins 228, 328, 348, 428, 448, 528 as described herein. Plate 1100 may also include a switch 1124. Switch 1124 may include or correspond to switch 224, 324, 424, 524 as described herein. Plate 1100 includes printed circuit 1130 which is coupled to switch 1124. Printed circuit 1130 may include or correspond to printed circuit 230, 330, 430, 500 as described herein. Plate 1100 may optionally (as indicated by dashed circle) include a display 1112. Display 1112 may include or correspond to display 212, 312, 412, 512, as described herein.

Plate 1100 also includes body 1104 that is coupled to plate portion 1102. In a particular implementation, plate portion 1102 and body 1104 may include a single unitary component. Plate 1100 also includes wire connectors 1190. The wire connectors 1190 may include or correspond to connectors 260 as described herein and may be configured to be coupled to a network cable, such as network cable 178. The wire connectors 1190 may be electrically coupled to pins of plate 1100 that are accessible to a plug via the opening 1120.

Figure 12B:
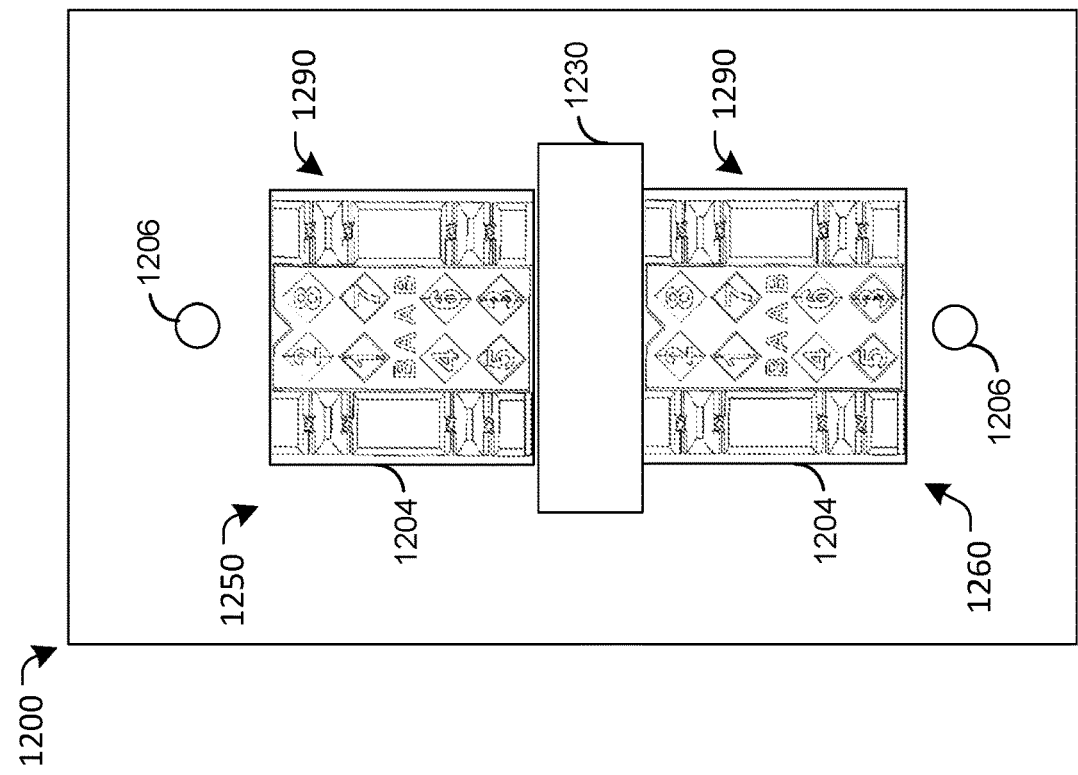
FIG. 12B illustrates a rear view of the plate of FIG. 12A.
Figure 12A:
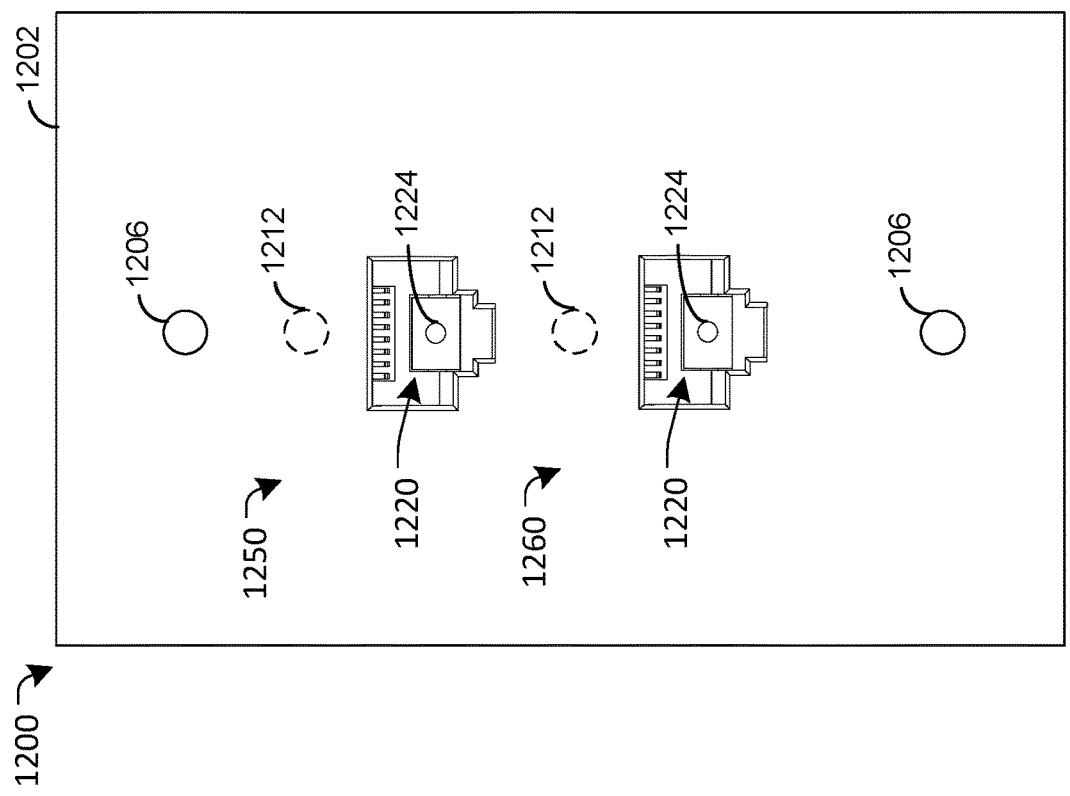
FIG. 12A illustrates a front view of a plate that includes a network cable connector according to one aspect of the present disclosure.

FIGS. 12A-12B depict an example of plate 1200 that includes multiple network cable connectors, as described herein, that may be used in the networked environment of FIG. 1 or other similar networked environment. For example, plate 1200 may include or correspond to plate 194. FIGS. 12A-12B each illustrates a different view of plate 1200. FIG. 12A illustrates a front view and FIG. 12B illustrates a rear view.

Plate 1200 includes a plate portion 1202 having mounting holes 1206 for mounting plate 1200 to a structure, such as a wall. As shown, plate 1200 include a first network connector 1250 and a second network connector 1260. Although plate 1200 is described as having two network connectors, in other implementations, plate 1200 may include more than two network connectors.

Each of the network connectors 1250, 1260 includes an opening 1220 associated with the network cable connector. Openings 1220 are each configured to receive and coupled to a network plug via contact pins of plate 1200. The pins of plate 1200 may include or correspond to contact pins 228, 328, 348, 428, 448, 528 as described herein. Each network connector 1250, 1260 may also include a switch 1224. Switches 1224 may include or correspond to switch 224, 324, 424, 524 as described herein. Plate 1200 includes printed circuit 1230 which is coupled to each of switches 1224. Printed circuit 1230 may include or correspond to printed circuit 230, 330, 430, 500 as described herein. As shown, plate 1200 includes a single printed circuit 1230 that is configured for operation with each of network connectors 1250, 1260. Alternatively, plate 1200 may include multiple printed circuits 1230, where each printed circuit corresponds to a different network connector. Each network connector 1250, 1260 may optionally (as indicated by dashed circle) include display 1212. Display 1212 may include or correspond to display 212, 312, 412, 512, as described herein.

Each network connectors 1250, 1260 also includes body 1204 that is coupled to plate portion 1202. In a particular implementation, plate portion 1202 and bodies 1204 may include a single unitary component. Each network connectors 1250, 1260 also includes wire connectors 1290. The wire connectors 1290 may include or correspond to connectors 260 as described herein and may be configured to be coupled to a network cable, such as network cable 178. The wire connectors 1290 may be electrically coupled to pins of a respective network connector 1250, 1260.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A network cable connector, comprising:
   a hood having an opening configured to receive a plug;
   a printed circuit incorporated into the hood and configured to couple to an external power source via one or more conductor wires; and
   a switch coupled to the printed circuit and incorporated into the hood;
   where the switch is configured to connect or disconnect at least one component of the printed circuit to or from the external power source, and
   where the at least one component includes a resistor.

2. The network cable connector of claim 1, further comprising a display incorporated into the hood, wherein the display is coupled to the printed circuit and configured to display information.

3. The network cable connector of claim 2, wherein the external power source comprises power-over-Ethernet (POE) power sourcing equipment (PSE), and wherein the printed circuit is configured to receive power for the display from the PSE.

4. The network cable connector of claim 1, wherein the external power source comprises a battery or direct (DC) power source.

5. The network cable connector of claim 1, wherein the printed circuit comprises a flex circuit or a printed circuit board, where the opening comprises a first opening configured to receive a first plug and a second opening configured to receive a second plug, where the switch is positioned in the first opening, and where, when the first plug is in the first opening and the second plug is in the second opening, the first plug is electrically coupled to the second plug via the network cable connector.

6. The network cable connector of claim 3, wherein the switch is configured to be manually operated to disconnect at least one component of the printed circuit from the external power source.

7. The network cable connector of claim 3, wherein the switch is configured to automatically disconnect at least one component of the printed circuit from the PSE when the plug associated with a POE powered device (PD) is inserted into the opening.

8. The network cable connector of claim 2, wherein the information indicates an operating status of the network cable connector, a power connection status of the network cable connector, a security setting of the network cable connector, an Internet protocol (IP) address of a device coupled to the network cable connector, a media access control (MAC) address of a device coupled to the network cable connector, or a combination thereof, where the resistor is a 25 k ohm resistor, and wherein the network cable connector is integrated in a wall plate.

9. A system comprising:
   an electric power source; and
   the network cable connector of claim 1.

10. The system of claim 9, wherein the external power source comprises power-over-Ethernet (POE) power sourcing equipment (PSE), and wherein the printed circuit is configured to receive power for a display from the PSE.

11. The system of claim 10, wherein the switch is configured to disconnect the at least one component of the printed circuit from the external power source based on a display being touched or pressed.

12. The system of claim 10, wherein the switch is configured to automatically disconnect at least one component of the printed circuit from the PSE when the plug associated with a POE powered device (PD) is inserted into the opening.

13. The system of claim 10, where the switch is positioned on a surface of the hood outside of the opening of the hood that is configured to receive the plug.

14. The system of claim 10, further comprising:
   a display incorporated into the hood and coupled to the printed circuit;
   wherein the external power source comprises power-over-Ethernet (POE) power sourcing equipment (PSE), and wherein the printed circuit is configured to receive power for the display from the PSE.

15. The system of claim 9, wherein the network cable connector is integrated in a wall plate.

16. A network cable connector, comprising:
   a hood having an opening configured to receive a plug;
   a resistor;
   a printed circuit incorporated into the hood and configured to couple to a power-over-Ethernet (POE) power sourcing equipment (PSE) via the resistor;
   a display coupled to the printed circuit and configured to display information; and
   a switch coupled to the printed circuit; and
   where the printed circuit is configured to request power for the display from the POE PSE, and
   where the switch is configured to connect or disconnect the resistor to or from the POE PSE.

17. The network cable connector of claim 16, where the switch is incorporated into the hood, where the switch is configured to connect or disconnect at least one component of the printed circuit to or from the PSE, and where the printed circuit is configured to selectively request the power by performing a power negotiation with the PSE.

18. The network cable connector of claim 17, wherein the switch is configured to be manually operated to disconnect the at least one component of the printed circuit from the PSE.

19. The network cable connector of claim 17, wherein the switch is configured to automatically disconnect the at least one component of the printed circuit from the PSE when a POE powered device (PD) is plugged into the network cable connector.

20. The network cable connector of claim 16, wherein the information relevant to the network cable connector comprises at least one piece of information selected from the group of pieces of information consisting of: an operating status of the network cable connector, a power connection status of the network cable connector, a security setting of the network cable connector, an Internet protocol (IP) address of a device coupled to the network cable connector, and a media access control (MAC) address of a device coupled to the network cable connector, and wherein the network cable connector comprises a keystone jack or a keystone coupler.

\* \* \* \* \*